United States Patent
Danziger et al.

(10) Patent No.: US 10,956,667 B2
(45) Date of Patent: Mar. 23, 2021

(54) OPERATIONAL TRANSFORMATIONS PROXY FOR THIN CLIENTS

(71) Applicant: Google Inc., Mountain View, CA (US)

(72) Inventors: Joshua Ari Danziger, Metuchen, NJ (US); Amod Karve, Clifton, NJ (US); Zachary Erik Lloyd, Brooklyn, NY (US); Yossi Kahlon, Montclair, NJ (US)

(73) Assignee: GOOGLE LLC, Mountain View, CA (US)

(*) Notice: Subject to any disclaimer, the term of this patent is extended or adjusted under 35 U.S.C. 154(b) by 1319 days.

(21) Appl. No.: 13/736,034

(22) Filed: Jan. 7, 2013

(65) Prior Publication Data

US 2015/0193404 A1 Jul. 9, 2015

(51) Int. Cl.
*G06F 40/197* (2020.01)
*G06F 40/166* (2020.01)

(52) U.S. Cl.
CPC .......... *G06F 40/197* (2020.01); *G06F 40/166* (2020.01)

(58) Field of Classification Search
CPC ................................ G06Q 10/10; G06F 17/24
See application file for complete search history.

(56) References Cited

U.S. PATENT DOCUMENTS

| 5,528,743 A | 6/1996 | Tou et al. |
|---|---|---|
| 5,758,358 A | 5/1998 | Ebbo |
| 5,761,669 A | 6/1998 | Montague et al. |
| 5,793,966 A | 8/1998 | Amstein et al. |
| 5,895,476 A | 4/1999 | Orr et al. |
| 5,930,813 A | 7/1999 | Padgett et al. |
| 6,006,239 A | 12/1999 | Bhansali et al. |
| 6,049,664 A | 4/2000 | Dale et al. |
| 6,169,999 B1 | 1/2001 | Kanno |
| 6,243,706 B1 | 6/2001 | Moreau et al. |
| 6,327,584 B1 | 12/2001 | Xian et al. |
| 6,330,046 B1 | 12/2001 | Ishitaka et al. |
| 6,341,305 B2 | 1/2002 | Wolfe |
| 6,377,354 B1 | 4/2002 | Nguyen et al. |
| 6,418,441 B1 | 7/2002 | Call |
| 6,501,779 B1 | 12/2002 | McLaughlin et al. |
| 6,512,531 B1 | 1/2003 | Gartland |
| 6,662,210 B1 | 12/2003 | Carleton et al. |

(Continued)

OTHER PUBLICATIONS

Cairns et al., "System and Method of Document Embedding in Collaborative Editors," unpublished U.S. Appl. No. 13/493,672, filed Jun. 11, 2012, 1-48.

(Continued)

*Primary Examiner* — Ariel Mercado
(74) *Attorney, Agent, or Firm* — Lowenstein Sandler LLP

(57) ABSTRACT

Systems and methods are disclosed herein for an operational transformation proxy for a thin client. The systems and methods may be used for collaboratively editing an electronic object such as an electronic document from a thin client. A first request is received at an OT proxy from the thin client to make a first change to a first version of the electronic object. A first mutation, including the first change to the first version of the electronic document, is created. A second mutation is received at the OT proxy from the server. At the OT proxy, the second mutation of the electronic object is converted into a third mutation of the electronic object based on the first mutation.

28 Claims, 12 Drawing Sheets

(56) References Cited

U.S. PATENT DOCUMENTS

| | | | |
|---|---|---|---|
| 6,705,584 B2 | 3/2004 | Hiroshima et al. | |
| 6,717,593 B1 | 4/2004 | Jennings | |
| 6,737,289 B2 | 5/2004 | Woo et al. | |
| 6,879,997 B1 | 4/2005 | Ketola et al. | |
| 6,967,704 B2 | 11/2005 | Hoshino | |
| 6,972,748 B1 | 12/2005 | Lang | |
| 6,983,316 B1 | 1/2006 | Bae et al. | |
| 7,009,626 B2 | 3/2006 | Anwar | |
| 7,026,100 B2 | 4/2006 | Nakata et al. | |
| 7,031,954 B1 | 4/2006 | Kirsch | |
| 7,035,910 B1 | 4/2006 | Dutta et al. | |
| 7,039,643 B2 | 5/2006 | Sena et al. | |
| 7,231,597 B1 | 6/2007 | Braun et al. | |
| 7,287,094 B2 | 10/2007 | Mogul | |
| 7,310,657 B2* | 12/2007 | Nakamura | G06F 9/54 709/204 |
| 7,437,421 B2 | 10/2008 | Bhogal et al. | |
| 7,478,330 B1 | 1/2009 | Branson et al. | |
| 7,487,448 B2 | 2/2009 | Emerson et al. | |
| 7,491,399 B2 | 2/2009 | Vakharia | |
| 7,529,778 B1 | 5/2009 | Dewey et al. | |
| 7,624,145 B2 | 11/2009 | Junuzovic et al. | |
| 7,656,543 B2 | 2/2010 | Atkins | |
| 7,680,932 B2 | 3/2010 | Defaix et al. | |
| 7,698,379 B2 | 4/2010 | Dutta et al. | |
| 7,712,016 B2 | 5/2010 | Jones et al. | |
| 7,774,703 B2 | 8/2010 | Junuzovic et al. | |
| 7,792,788 B2 | 9/2010 | Melmon et al. | |
| 7,836,148 B2 | 11/2010 | Popp et al. | |
| 7,890,928 B2 | 2/2011 | Patrudu | |
| 7,920,240 B2 | 4/2011 | Yonemura | |
| 7,953,696 B2 | 5/2011 | Davis et al. | |
| 7,958,448 B2 | 6/2011 | Fattic, II et al. | |
| 7,983,416 B2 | 7/2011 | Takashima et al. | |
| 8,019,780 B1 | 9/2011 | Pinkerton et al. | |
| 8,044,961 B2 | 10/2011 | Opstad et al. | |
| 8,065,604 B2 | 11/2011 | Blankinship | |
| 8,073,812 B2 | 12/2011 | Curtis | |
| 8,327,127 B2 | 12/2012 | Suryanarayana et al. | |
| 8,327,812 B2 | 12/2012 | Vuk | |
| 8,395,733 B2 | 3/2013 | Ataka et al. | |
| 2001/0033917 A1 | 10/2001 | Hoshino | |
| 2001/0037346 A1 | 11/2001 | Johnson | |
| 2002/0032701 A1 | 3/2002 | Gao et al. | |
| 2002/0035580 A1 | 3/2002 | Tanabe | |
| 2002/0133492 A1 | 9/2002 | Goldstein et al. | |
| 2002/0174085 A1 | 11/2002 | Nelson et al. | |
| 2003/0037076 A1 | 2/2003 | Bravery et al. | |
| 2003/0037303 A1 | 2/2003 | Bodlaender et al. | |
| 2003/0084078 A1 | 5/2003 | Torii et al. | |
| 2003/0115268 A1 | 6/2003 | Esposito | |
| 2003/0179230 A1 | 9/2003 | Seidman | |
| 2004/0015781 A1 | 1/2004 | Brown et al. | |
| 2004/0044965 A1 | 3/2004 | Toyama et al. | |
| 2004/0085354 A1 | 5/2004 | Massand | |
| 2004/0088374 A1 | 5/2004 | Webb et al. | |
| 2004/0088653 A1 | 5/2004 | Bell et al. | |
| 2004/0133444 A1 | 7/2004 | Defaix et al. | |
| 2004/0215672 A1 | 10/2004 | Pfitzner | |
| 2004/0215825 A1 | 10/2004 | Pfitzner | |
| 2004/0215826 A1 | 10/2004 | Pfitzner | |
| 2004/0216090 A1 | 10/2004 | Kaler et al. | |
| 2005/0091291 A1 | 4/2005 | Kaler et al. | |
| 2005/0125461 A1 | 6/2005 | Filz | |
| 2005/0131887 A1 | 6/2005 | Rohrabaugh et al. | |
| 2005/0185636 A1 | 8/2005 | Bucher | |
| 2005/0200896 A1 | 9/2005 | Narusawa et al. | |
| 2005/0234943 A1 | 10/2005 | Clarke | |
| 2006/0031751 A1 | 2/2006 | Ehud | |
| 2006/0075332 A1 | 4/2006 | Fairweather et al. | |
| 2006/0101071 A1 | 5/2006 | Henderson | |
| 2006/0149831 A1 | 7/2006 | Dutta et al. | |
| 2006/0200755 A1 | 9/2006 | Melmon et al. | |
| 2006/0230344 A1 | 10/2006 | Jennings et al. | |
| 2006/0248121 A1 | 11/2006 | Cacenco et al. | |
| 2007/0033654 A1 | 2/2007 | Wilson | |
| 2007/0061714 A1 | 3/2007 | Stuple et al. | |
| 2007/0070066 A1 | 3/2007 | Bakhash | |
| 2007/0073899 A1 | 3/2007 | Judge et al. | |
| 2007/0094601 A1 | 4/2007 | Greenberg et al. | |
| 2007/0186157 A1 | 8/2007 | Walker et al. | |
| 2007/0208992 A1 | 9/2007 | Koren | |
| 2007/0220068 A1 | 9/2007 | Thompson et al. | |
| 2007/0233811 A1 | 10/2007 | Rochelle et al. | |
| 2007/0239695 A1 | 10/2007 | Chakra et al. | |
| 2007/0279572 A1 | 12/2007 | Yonemura | |
| 2007/0288637 A1 | 12/2007 | Layton et al. | |
| 2007/0299857 A1 | 12/2007 | Gwozdz | |
| 2008/0028302 A1 | 1/2008 | Meschkat | |
| 2008/0040659 A1 | 2/2008 | Doyle | |
| 2008/0059539 A1 | 3/2008 | Chin et al. | |
| 2008/0082604 A1 | 4/2008 | Mansour et al. | |
| 2008/0126943 A1 | 5/2008 | Parasnis et al. | |
| 2009/0112990 A1 | 4/2009 | Campbell et al. | |
| 2009/0192845 A1 | 7/2009 | Gudipaty et al. | |
| 2009/0235181 A1 | 9/2009 | Saliba et al. | |
| 2009/0328063 A1 | 12/2009 | Corvera et al. | |
| 2010/0030578 A1 | 2/2010 | Siddique et al. | |
| 2010/0083096 A1 | 4/2010 | Dupuis-Latour et al. | |
| 2010/0153948 A1 | 6/2010 | Schreiber et al. | |
| 2010/0218099 A1 | 8/2010 | van Melle et al. | |
| 2010/0235763 A1 | 9/2010 | Massand | |
| 2010/0241749 A1 | 9/2010 | Rasmussen et al. | |
| 2010/0245256 A1 | 9/2010 | Estrada et al. | |
| 2010/0251122 A1 | 9/2010 | Lee et al. | |
| 2011/0066957 A1 | 3/2011 | Prats et al. | |
| 2011/0085211 A1 | 4/2011 | King et al. | |
| 2011/0154185 A1 | 6/2011 | Kern et al. | |
| 2011/0178981 A1 | 7/2011 | Bowen et al. | |
| 2011/0302237 A1 | 12/2011 | Knight et al. | |
| 2012/0072819 A1 | 3/2012 | Lindner et al. | |
| 2012/0110445 A1 | 5/2012 | Greenspan et al. | |
| 2012/0331061 A1* | 12/2012 | Lininger | G06F 17/5004 709/205 |
| 2012/0331373 A1 | 12/2012 | Lindner et al. | |
| 2013/0120367 A1* | 5/2013 | Miller | G06T 15/00 345/419 |
| 2013/0120368 A1* | 5/2013 | Miller | G06T 15/00 345/419 |

OTHER PUBLICATIONS

Cairns et al., "System and Method of Secure Communication Between Multiple Child Frames," unpublished U.S. Appl. No. 13/493,798, filed Jun. 11, 2012, 1-47.

Cayenne-McCall, "Synchronous 3D Document Collaboration," Pace University, Department of Computer Sciene; Nov. 2008. (42 Pages).

Citro, "Conflict Management for Real-Time Collaborative Editing in Mobile Replicated Architectures," 2007, Australian Computer Society, Inc., Thirteenth Australian Computer Science Conference (ACSC2007), pp. 115-124.

Conner, Zoho 4 Everyone, 2008, downloaded from the internet http://techbus.safaribooksonline.com/print?xmlid=9780768687835/ch011ev1 sec1, Aug. 21, 2012, p. 1-17.

Day-Richter et al., "System and Method for Managing Remote Procedure Calls Relating to a Third Party Software Application," unpublished U.S. Appl. No. 13/591,851, filed Aug. 22, 2012, pp. 1-98.

Day-Richter et al., "System and Method for Performing Data Management in a Collaborative Development Environment," unpublished U.S. Appl. No. 13/591,734, filed Aug. 22, 2012, pp. 1-101.

DeJean, David, "Online office apps get real: Google Docs vs. ThinkFree vs. Zoho, Web-based suites have become real challengers to desktop applications," Jul. 16, 2008, Computerworld [online]. Retrieved from the Internet: <URL: http://www .computerworld .com/s/article/pri nt/9108 799/0n line_ office_ apps get_real_ Google D ocs vs ThinkFree vs. Zoho> (7 pp.).

Ellis et al., Groupware Some Issues and Experiences, Communications of the Association for Computing Machinery, ACM, 34:1, Jan. 1, 1991,38-58.

(56) References Cited

OTHER PUBLICATIONS

Googlepedia: The Ultimate Google Resource, Third Edition, pp. 276-287 (2008).
Grieve et al., "Systems and Methods for Collaborative Document Editing," unpublished U.S. Appl. No. 13/297,762, filed Nov. 16, 2011, pp. 1-49.
Hodel et al., "Supporting Collaborative Layouting in Word Processing," University of Zurich, Department of Inforamtics; Zurich, Switzerland, 2004 (18 page).
Holzer, "Google Docs 4 Everyone" http://www.scribd.com/doc/14119795/Google-Docs-4-Everyone Published Feb. 2009.
Ignat et al., "Awareness of Concurrent Changes in Distributed Software Development," Nancy-Universite, France 2008 (9 pages).
Ignat et al., "CoDoc: Multi-mode Collaboration over Docuemtns," ETII Surich,Institute for Information Systems; Zurich, Switzerland, 2004 (15 pages).
Kjaer, "Timing and Synchronization in JavaScript", Dev. Opera, Sections:"The Basics", "Event Queing", "Long Running Scripts" and "Advice on Timing", Feb. 27, 2007, downloaded from URL: http/dev.opera.com/articles/view/timing-and-synchronization-injavascript/, pp. 1-9.
Lemonik et al., "System and Method for Using a Third-Party Add-On in a Collaborative Online Software Development Environment," unpublished U.S. Appl. No. 13/551,859, filed Jul. 18, 2012, 1-103.
Lemonik et al., "System and Method for Providing Access to a Document Associated with a Third Party Software Application Via Interframe Communication," unpublished U.S. Appl. No. 13/224,769, filed Sep. 2, 2011, pp. 1-90.
Lemonik et al., "System and Method for Providing Real-Time Collaborative Document Editing Services," unpublished U.S. Appl. No. 13/224,573, filed Sep. 2, 2011, pp. 1-90.
Lemonik et al., "System and Method for Updating an Object Instance Based on Instructions Received from Multiple Devices," unpublished U.S. Appl. No. 13/282,636, filed Oct. 17, 2011, pp. 1-91.
Lemonik et al., "System and Method for Updating an Object Instance Based on Instructions Received from Multiple Devices," unpublished U.S. Appl. No. 13/224,479, filed Sep. 2, 2011, pp. 1-91.
Lemonik et al., "System and Method for Using a Third-System and Method for Using a Third-Party Add-On to Manipulate a Document in a Collaborative Online Software Development Environment," unpublished U.S. Appl. No. 13/551,772, filed Jul. 18, 2012, 1-119.
Lemonik et al., "System and Method to Provide Collaborative Document Processing Services Via Interframe Communication," unpublished U.S. Appl. No. 13/224,663, filed Sep. 2, 2011, pp. 1-90.
Lemonik et al., "System and Method for Providing Data Management Services," unpublished U.S. Appl. No. 13/224,860, filed Sep. 2, 2011, pp. 1-88.
Nasir et al., "Collaborative Report Creation System for Industrial Use," Yamagata University, Graduate School of Science and Engineering; Yamagata, Japan 2009 (6 pages).
Pereira et al., Merging Electronic Document Redraws, unpublished U.S. Appl. No. 13/006,259, filed Jan. 13, 2011, pp. 1-30.
Pereira et al., Merging Electronic Document Redraws, unpublished U.S. Appl. No. 13/282,753, filed Oct. 27, 2011, pp. 1-30.
Quinn, "Comparing Online vs. Traditional Office Software, Will desktop or online office software fit your non-profit needs best?" May 21, 2010, courtesy of Idealware,TechSoup.org [online]. Retrieved from the Internet L:http://www.techsoup.org/learningcenter/software/page11852.cfm (4 pp.).
Raman, "Cloud Computing and Equal Access for All," Google Inc. 2008 (4 pages).
Shen et al., "Flexible Merging for Asynchronouse Collaborative Systems," Griffith University, School of Computing an Information Technology, Brisbane, Australia 2002 (18 pages).
Shen et al., "Integrating Advanced Collaborative Capabilities into Web-Based Word Processors," Nauyang Technological University, School of Computer Engineering, Singapore 2007 (8 pages).
Sun et al., "Operational Transformation in Real-Time Group Editors: Issues, Algorithms, and Achievements," 1998, ACM Conference on Computer-Supported Cooperative Work, pp. 1-10.
Tyson, Herb, "Microsoft Word 2007 Bible," 2007, pp. 112-115, p. 467, pp. 523-525, p. 798.
Unpublished U.S. Appl. No. 13/166,844, filed Jun. 23, 2011.
Unpublished U.S. Appl. No. 13/244,530, filed Sep. 2, 2011.
Unpublished U.S. Appl. No. 13/274,382, filed Oct. 17, 2011.
Using Adobe Buzzword, 2008, pp. 1-35.
Wikipedia, the free encyclopedia, "Model-View-Controller," downloaded on Nov. 16, 2010 [online]. Retrieved from the Internet: URL:http://en.wikipedia.org/wiki/Modei%E2%80%93view%E2%80%93controller, pp. 1-10.
Bibi et al., "A Platform for Delivering Multimedia Presentations on Cultural Heritage," 2010 14th Panhellenic Conference on Informatics, pp. 175-179.
Ellis et al., "Concurrency Control in Groupware Systems," ACM 1989, pp. 399-407.
Huang et al., "A General Purpose Virtual Collaboration Room," Google 1999, pp. 1-9.
Kindberg, "Mushroom: A Framework for Collaboration and Interaction across the Internet," Google 1996, pp. 1-11.
Nichols et al., "High-Latency, Low-Bandwidth Windowing in the Jupiter Collaboration System," UIST' 95, pp. 111-120, Nov. 14-17, 1995.
Pacull et al., "Duplex: A Distributed Collaborative Editing Environment in Large Scale," ACM 1994, pp. 165-173.
Wang et al., "Google Wave Operational Transformation," wave-protocol.googlecode.com/hg/whitepapers/operational-transform/operational-transform.html, Version 1.1, pp. 1-7, Jul. 2010.
Wikipeda, "Operational Transformation," http://en.wikipedia.org/wiki/Operation_transformation, pp. 1-14.

\* cited by examiner

411 ↘

| 412 SESSION PARAMETERS OBJECT ID | 414 LIST OF PENDING REQUESTS FROM THIN CLIENT <SEQ#, BEHAVIOR REQUEST> |
|---|---|
| 0x00002000 | <21, LIST OF THIN CLIENT COMMANDS> |
|  | <22, LIST OF THIN CLIENT COMMANDS> |
| 0x00002100 | <10, LIST OF THIN CLIENT COMMANDS> |
|  | <12, LIST OF THIN CLIENT COMMANDS> |

| 516 SESSION PARAMETERS OBJECT ID | 518 LIST OF MUTATIONS SENT TO SERVER |
|---|---|
| 1 | DELETE ROW() |
|  | SWAP COLUMN () |
|  | UPDATE CELL() |
|  | DEFINE RANGE() |
| 2 | INSERT COLUMN () |
|  | UNDEFINERANGE() |
|  | DEFINERANGE() |
|  | SWAP ROWS() |

| SESSION PARAMETERS OBJECT ID (620) | MODEL STATE (622) | REVISION NUMBER (624) |
|---|---|---|
| 0x00002000 | LIST OF MUTATIONS REPRESENTING MODEL | 1 |
| 0x00002000 | LIST OF MUTATIONS REPRESENTING MODEL | 2 |
| 0x00002000 | LIST OF MUTATIONS REPRESENTING MODEL | 3 |

FIG. 7

| SESSION PARAMETERS OBJECT ID (726) | LAST PROCESSED THIN CLIENT SEQUENCE NUMBER (728) | LAST KNOWN THIN CLIENT SEQUENCE NUMBER (730) | LAST ACKNOWLEDGED THIN CLIENT SEQUENCE NUMBER (732) | LAST MODEL STATE REVISION SENT TO THIN CLIENT (734) |
|---|---|---|---|---|
| 0x00002000 | 20 | 22 | 19 | 2 |
| 0x00002100 | 21 | 21 | 21 | 1 |
| 0x00002200 | -1 | -1 | -1 | 1 |

OPERATIONAL TRANSFORMATIONS PROXY FOR THIN CLIENTS

FIELD OF INVENTION

The present disclosure relates generally to collaborative editing of electronic objects and more specifically to collaborative editing of electronic objects such as electronic documents for thin clients.

BACKGROUND

Systems for implementing collaborative editing generally manage concurrent modifications of an electronic object, ensuring sequential correctness of the modifications, and/or synchronizing changes from one or more collaborators. In a traditional server-client model, a client displays a view/model of the electronic object. When the client updates the view/model, the updates are first sent to the server and in response the server provides the client with a new view/model for the electronic object. The client blocks its user interface (UI) until it receives an updated view/model of the electronic object. The blocking of the UI in combination with possible network latency can make the collaborative editing process extremely tedious, causing users to have to wait for the an update from the server in response to making any update of the view/model.

Operational transformation (OT) frameworks allow clients to update a local view/model of the electronic object without having to wait for a server to respond to a request to update the view/model. The server may maintain a history of states of the electronic object of one or more clients. The server may receive updates of the respective local views/models from multiple clients and operationally transform the updates from the multiple clients based on the stored state of each client. The server also may operationally transform the updates received from a client based on updates received from the other clients. The server may apply the transformed updates to the client states such that each of the client states converges to a similar state on the application of the transformed updates from the clients. The respective local versions of the views/models on each client are consequently updated by the server with the transformed updates. The non-blocking nature of the OT client user interface may provide for a better user experience as users do not have to wait for server updates before making other subsequent updates. However, this process may be resource-intensive on the server side as the server may store the client states and the updates made by the clients. As the number of clients increase, the resource-intensiveness of this architecture may result in scalability and/or performance issues.

With more sophisticated client devices and more capable browser applications, one way to reduce the stress on the server is to operationally transform updates on the clients. For example, the server may serve as a communication hub between different smart clients and allow the smart clients to perform the operational transformation of updates of a collaborative electronic document. This can improve the time taken to update the local version of the document at the smart client with the transformed updates as the client does not need to wait for a server application to transform the updates. However, operationally transforming updates on the clients may result in a re-architecture of the server application. While this new system architecture may support smart clients, it may not be able to support a client that is not capable of understanding transformable server updates and/or handling the operational transformation of updates of the electronic object. Such a client, referred to herein as a thin client, may include clients with limited hardware resources and/or limited functionality web browser applications. With increasing use of thin client devices, such as mobile devices, the new system architecture creates a technical challenge.

SUMMARY

Systems and methods disclosed herein provide for operational transformation of updates of an electronic object from a thin client. This disclosure combines the concepts of proxy servers and operational transformation to support thin clients. For example, a system architecture that implements operational transformation logic on smart clients may allocate an intermediate component ("OT proxy"). In an exemplary case of an electronic document, the server receives updates of the collaborative electronic document from users with smart clients. The server transmits to the thin client the updates from the smart clients. The OT proxy, on behalf of the thin client, may receive from the server updates of the collaborative electronic document. The OT proxy transforms the server updates based on pending changes from the thin client. Likewise, the OT proxy receives from the thin client updates of the collaborative electronic document. The OT proxy operationally transforms the thin client updates based on pending server changes. The OT proxy transmits the transformed updates to the server and the thin client. In order to transform the updates, the OT proxy stores a running copy of thin client and server versions of the collaborative electronic document. The OT proxy provides for convergence of the thin client and the server versions of the collaborative electronic document. The convergence of the server version and the thin client version helps users access a consistent collaborative electronic document. Therefore, the disclosure describes a scalable collaborative editing system for supporting a diverse set of clients and user devices.

Systems and methods disclosed herein provide for collaborative editing of an electronic object from a thin client. In some cases, the electronic object may be a collaborative electronic document. One aspect relates to systems and methods for an operational transformations proxy (OT proxy) for a thin client. A first request is received at an OT proxy from the thin client to make a first change to a first version of the electronic document. The first version includes a copy of the electronic document on the thin client and the first request includes a first sequence number and a first revision number. The first sequence number corresponds to a unique number for identifying the first request received from the thin client. A first mutation, including the first change of the first version of the electronic document, is created. The first mutation corresponds to the first request received from the thin client. A second mutation is received at the OT proxy from the server. The second mutation includes a second change of a second version of the electronic document. The second version includes another copy of the electronic document on the server. At the OT proxy, the second mutation of the electronic document is converted into a third mutation of the electronic document based on the first mutation. A first response is transmitted from the OT proxy to the thin client. The first response includes a third change corresponding to the third mutation of the electronic document, a second revision number corresponding to the second version of the document on the server, and a second sequence number corresponding to a last acknowledged sequence number for the thin client. A second response is transmitted from the OT proxy to the server. The second response includes the first mutation and the first revision number corresponding to the first version of the electronic document.

BRIEF DESCRIPTION OF DRAWINGS

The above and other features of the present disclosure, including its nature and its various advantages, will be more apparent upon consideration of the following detailed description, taken in conjunction with the accompanying drawings in which:

FIGS. 2-7 are example data structures for storing data related to a thin client session, according to an illustrative embodiment;

DETAILED DESCRIPTION

To provide an overall understanding of the disclosure, certain illustrative embodiments will now be described, including a system for implementing an OT proxy for thin Clients. However, it will be understood that the systems and methods described herein may be adapted and modified as is appropriate for the application being addressed and that the systems and methods described herein may be employed in other suitable applications, and that such other additions and modifications will not depart from the scope thereof. While systems and methods described herein refer to operational transformation of a collaborative electronic document, it will be understood that these systems and methods may apply to updates of any type of electronic object.

Figure 1:
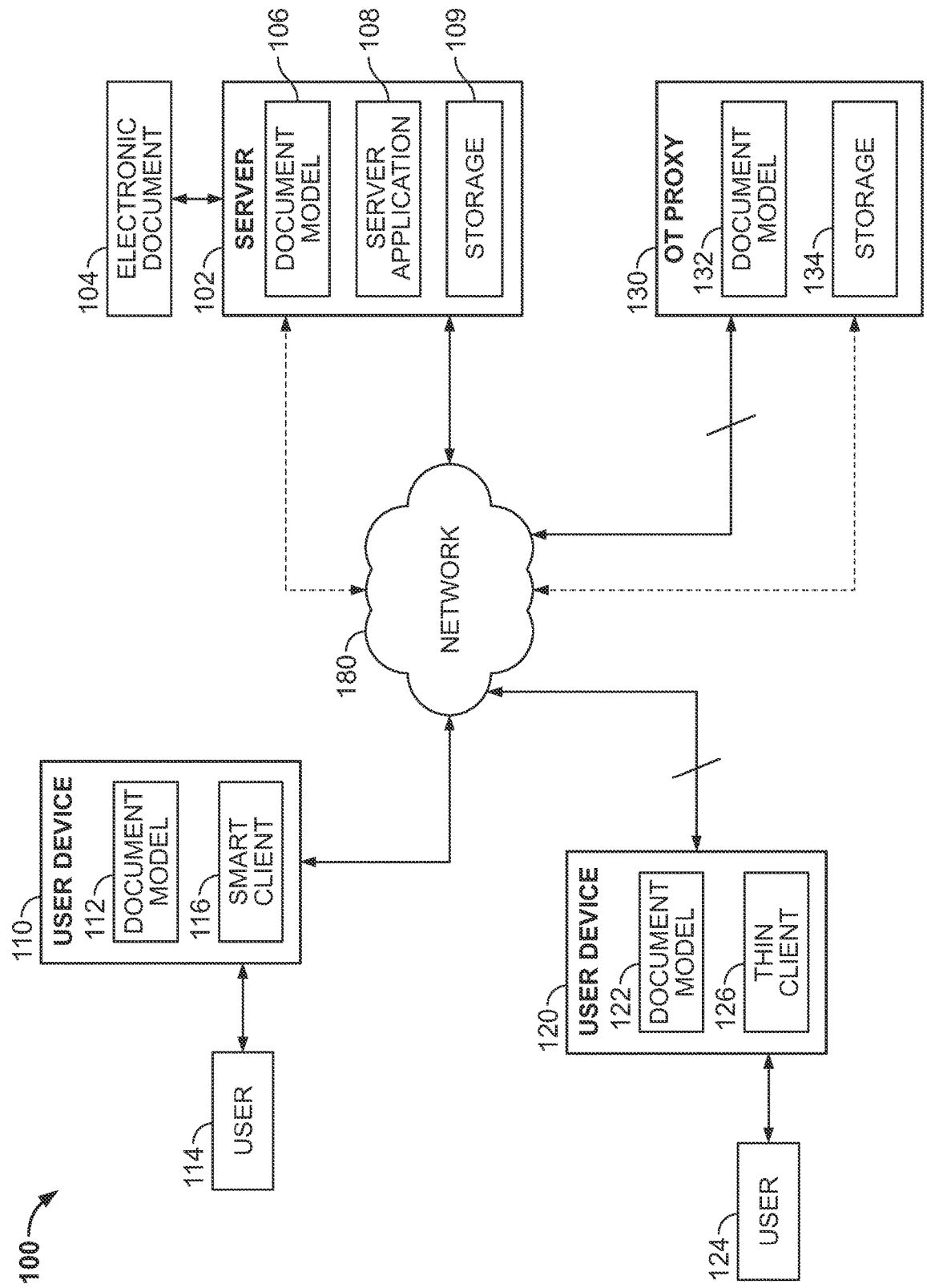
FIG. 1 is a block diagram of a computerized system for editing a collaborative electronic object such as an electronic document, according to an illustrative embodiment.

FIG. 1 is a diagram of a system that may be used to implement systems and methods disclosed herein. FIG. 1 is a block diagram of a computerized system 100 for implementing an OT proxy 130 for a thin client 126. System 100 includes a server 102, user devices 110 and 120, and the OT proxy 130 connected over a network 180.

A server application 108 is configured to transmit and receive data over the network 180 in communication with user devices 110 and 120, and the OT proxy 130. The server application 108 receives a request to access a collaborative electronic document 104 from user device 110 and/or user device 120. It is understood that the collaborative electronic document 104 is an exemplary electronic object and the server application 108 may receive a request to access any type of electronic object from user device 110 and/or user device 120. In response to the request, the server application 108, loads a subset of the collaborative electronic document 104. In some implementations, the server application 108 loads the subset of the collaborative electronic document as a document model 106. The server application 108 may store one or more data structures relevant to communicating with user devices 110 and 120, and/or the OT proxy 130 in storage 109. The server application may transmit the document model 106 to user devices 110 and 120, and/or OT proxy 130 to coordinate updates to electronic document 104.

The server 102 may include a processor and a memory unit (not shown). The memory unit stores computer executable instructions, which are executed by the processor. The computer executable instructions include instructions for receiving data over the network 180 from user devices 110 and 120, and OT proxy 130, storing data in the storage 109, and transmitting updates over the network 180 to user devices 110 and 120, and OT proxy 130. As depicted in FIG. 1, the collaborative electronic document 104 is stored on a separate device from the server 102, but the collaborative electronic document 104 also may be stored in the storage 109 of the server 102 or even in the memory unit included within the server 102. In addition to interacting with the collaborative electronic document 104, the server may load a document model 106 of the collaborative electronic document 104 in its memory unit. The document model 106 is a subset of the collaborative electronic document 104 and represents a structured way to store and manipulate elements of the collaborative electronic document 104. In addition, any data described herein as being stored in the storage 109 may instead or additionally be stored on the memory unit of the server 102 or on a separate memory unit external to the server 102.

Users 114 and 124 at user devices 110 and 120, respectively, may interact with the collaborative electronic document 104. Each user device 110 and 120 may include a local subset of the collaborative electronic document 108 in the form of a document model 112 and 122, respectively. Each user device 110 and 120 may include a device such as a personal computer, a laptop computer, a tablet, a smart phone, a personal digital assistant, or any other suitable type of computer or communication device. Each user 114 and 124 may interact with the document model 112 and 122 respectively through a respective view (not shown) on each user device 110 and 120. The view (not shown) may be a subset of the document model 112 and 122. A user interface (not shown) may be used by each user 112 and 122 to interact with the view (not shown) of the document. Changes made to the view may propagate to the document model 112 and 122. Users 114 and 124 at the user devices 110 and 120, respectively, send and receive information from the server 102 over the network 180. In some implementations, the user devices 110 and 120 may send and receive information regarding updates of a collaborative electronic document via the OT proxy 130. The user devices 110 and 120 may include typical components, for example, an input device, an output device, and a communication interface. A user may authenticate with the server 102 by inputting a user name and password (or providing other identification information) via a user interface, such that the same user device may be used by different users at different times. While FIG. 1 illustrates two users 114 and 124 at two user devices 110 and 120, respectively, system 100 may include more users that may send and receive information from the server 102 via network 180. Likewise, system 100 may include one or more user devices that may send and receive information from the server 102 via network 180. In some implementations, a single user may send and receive information from the server 102 via network 180 using multiple user devices. For example, user 114 may use the user device 110 and the user device 120 to send and receive information from the server 102 over network 180.

Users interact with the server 102 such that the users 114 and 124, in conjunction with the server 102, compose a collaborative electronic document 104 by modifying a document model 112 and 122, respectively. The clients 116 and 126 of the user devices 110 and 120, respectively, communicate to the server 102 the user updates of the document models 112 and 122. Although illustrated as a single device in FIG. 1, the server 102 may be implemented as, for example, a single computing device or as multiple distributed computing devices. The interaction of users 114 and 124 with the server 102 is through clients 116 and 126, respectively. Although system 100 illustrates a one to one relation between users and user devices, it is possible that a single user can use multiple user devices to compose the collaborative electronic document 104. Likewise, multiple users can use a single user device to compose the collaborative electronic document 104. The clients 116 and 126 may include web browsers, mobile document collaboration applications, and other suitable client applications. For example, the document model 112 may be viewed with an application that displays the document model 112 within a web browser. In this arrangement, users may not need to install software locally to their user devices 110 and 120 to view and make changes to the document model 112 and 122, respectively. When browsers or user interfaces are discussed herein, these terms are intended to refer to any program that allows a user to browse documents, regardless of whether the browser program is a standalone program or an embedded program, such as a browser program included as part of an operating system. The logic described herein can be implemented in hardware, software, firmware, or a combination thereof.

In an example implementation, the collaborative electronic document 104 is a spreadsheet document. It will be understood that the features and concepts described herein may be applied in electronic objects of any type, including, for example text documents, presentation documents, drawing documents, forms, scripts, data structures, web application objects, and other similar electronic objects. Accordingly, a document model 106, 112, 122, and/or 132 of a collaborative electronic document 104 may include a suitable way for addressing and storing elements of a collaborative electronic document. Likewise, an object model may be used for addressing and storing elements of an electronic object. In one example implementation, the elements of a spreadsheet are addressed using a tuple of data including column index, row index, and sheet index. A collection of elements may be addressed using ranges. A range definition may include information defining four bounds of a rectangular collection of cells. In addition to the bounds, extra information for the various properties of elements of a spreadsheet document also may be stored. Information indicating other suitable properties of elements of the collaborative electronic document 104 also may be represented in the document model 106.

In some implementations, a document model may be stored in the form of mutations of the collaborative electronic document 104. Mutations may include transformable instructions for commanding changes to the collaborative electronic document 104. For example, mutations may include transformable instructions such as insert rows, delete rows, swap rows, insert columns, delete columns, swap columns, update, move-cells, define-range and/or other transformable instructions for commanding changes to a spreadsheet document. The transformable instructions commanding changes to the collaborative electronic document 104 may persist over time to define the elements of the collaborative electronic document 104. An instruction commanding a change to the collaborative electronic document 104 may be transformable if the instruction can be adjusted for structural changes to the collaborative electronic document 104. In case of a spreadsheet document, for example, structural changes may include insertion, deletion, movement, and/or other changes to the rows and/or columns structure of the spreadsheet document. In some cases, structural changes may cause the transformable instructions commanding changes to the collaborative electronic document 104 to be adjusted for positions affected by the structural change. For example, an instruction commanding an update to a cell at a tuple (row 1, column 1, sheet 1) of a spreadsheet document with a value of 2 may have to be adjusted for position in case a row is inserted before the row 1 of sheet 1 of the spreadsheet document. The insertion of the row before the first row may result in a transformation of the instruction to an instruction commanding an update of a cell at a tuple (row 2, column 1, sheet 1) of the spreadsheet document with a value of 2. Some spreadsheet documents may include cells that depend on other cells and/or ranges. The cells that depend on other cells and/or ranges are referred to herein as formula cells. In case of formula cells, a structural change may result in the transformation of instructions commanding the cells and/or ranges affected by the structural change and instructions commanding the formula cells that depend on the affected ranges. As indicated above, the document model 106, 112, 122, and 132 may be stored as a series of mutations on various addressable cells, ranges, and/or other elements of a spreadsheet document. While this description relates to the spreadsheet model, it would be understood that similar document models can be applied to other types of electronic documents, such as text documents, presentation documents, drawing documents, forms, scripts, and other similar collaborative documents.

In some implementations of a collaborative editing environment such as the one illustrated in computerized system 100 of FIG. 1, operational transformations are used to coordinate the collaborative editing process. Operational transformations allow user devices 110 and 120 to maintain a local version of the document model 112 and 122, respectively. The users 114 and 124 interact with the local document models 112 and 122 using clients 116 and 126, respectively. For example, a user 114 modifies the collaborative electronic document 104 by modifying the document model 112 via the smart client 116. Updates from the user 114, in this example, are sent to the server 102 via network 180. The server application 108 receives the updates, transforms them based on a global view of the document models across different user devices collaborating on electronic document 104, applies the updates to the server document model 106, and sends the transformed updates to the different user devices. This process is repeated until the different user devices collaborating on the collaborative electronic document 104 converge to a common document model for the collaborative electronic document 104. In some implementations of the computerized system 100, the server application 108 may be used for tracking multiple local document models, receiving mutations from multiple clients, and forwarding the mutations to the multiple clients or a subset of the multiple clients. The user devices 110 and 120 may receive from the server 102 a document model 106 and/or a mutation to the document model 106 from another user device. The user devices may transform (e.g. update) the mutation received from the server based on another mutation that may have been made on their local document model, and apply it to their local document model.

There may be two types of clients for accessing the collaborative electronic document 104. One type of client may be a smart client 116. This smart client 116 may include multi-threaded web browsers, collaborative electronic document editing applications, and/or other suitable document editing applications. The smart client 116 may generally be able to store the document model 112 as a list of mutations. The smart client 116 also may be able to receive updates of the document model 112 from the server 102 in the form of mutations and may be able transform the mutations based on modifications made by user 114 to the document model 112. The smart client may in turn send the transformed mutations to the server to update the collaborative electronic document 104.

Another type of client is a thin client 126. As used herein, a thin client is a client that relies on another system for performing at least some of the smart client's operations. The thin client 126 may be a single threaded browser application, a collaborative electronic document editing application, a mobile collaborative electronic document editing application, a web application client, and/or any other suitable application for modifying and/or viewing a collaborative electronic document 104. In some implementations, the thin client 126 may not perform at least some transformations of mutations received from server 102 of a collaborative electronic document 104. The thin client 126 may, for example, be incapable of performing such transformations due to hardware limitations, limited functionality web browser application, complexity of the transformation, the way the client is configured, and/or any other suitable reason. The thin client 126 may generally store the document model 122 as a subset of the collaborative electronic document 104. Updates of the document model 122 on the thin client 126 may be represented as high-level commands for executing actions on elements of the collaborative electronic document 104. For example, a high-level command can be a sort command for sorting text from one position to another position within the document. High-level commands are different from low-level commands, such as mutations, as the high-level commands operate on data at a higher level of abstraction than the low-level commands or mutations. For example, a high-level command for sorting text from one position to another position within the document may be represented as multiple mutations for moving data from one point to another within the document. In some implementations, updates from the thin client 126 of the collaborative electronic document 104 are transmitted to the server 102 via an OT proxy 130. Updates of the document model 122 from the server 102 may be transmitted via the OT proxy 130. In some implementations, updates from the thin client 126 of the collaborative electronic document 104 are applied to the document model 122. In some implementations, updates from the thin client 126 of the collaborative electronic document 104 are applied to a view on the thin client 126 of the document model 122.

The OT proxy 130 is an intermediate component between the server 102 and the thin client 126. The OT proxy 130 may send and receive changes from the thin client 126 of the collaborative electronic document 104. The changes received from the thin client 126 may be in the form of a request to update the electronic document 104. It would be understood that a change and an update to the electronic document 104 can used interchangeably. In response to receiving changes from the thin client 126, the OT proxy may convert and transform the changes to mutations of the collaborative electronic document 104. In response to converting and transforming the mutations, the OT proxy may transmit to the server 102 and/or the thin client 126 mutations and/or changes, respectively, of the collaborative electronic document 104. The OT proxy 130 may store data for supporting operational transforms for thin clients in storage 134. In addition to the storage 134, the OT proxy may have its own memory unit (not shown) and may store the data in its memory unit. As depicted in FIG. 1, the OT proxy 104 is shown as a separate component from the server 102, but the OT proxy also may be implemented on the same component as the server 102. In some implementations the OT proxy 130 may be a part of a distributed server 102.

In some implementations of a collaborative editing environment such as the one illustrated in computerized system 100 of FIG. 1, operational transformations are used for the collaborative editing process of a web application object. A web application object may be a discussion forum, a review page, a social web application page, and/or other suitable web application objects. The server application 108 receives a request to access the web application object from user device 110 and/or user device 120. In response to the request, the server application 108, loads a subset of the web application object. In some implementations, the server application 108 loads the subset of the web application object as an object model. The server application 108 may store one or more data structures relevant to communicating with user devices 110 and 120, and/or the OT proxy 130 in storage 109. The server application may transmit the object model to user devices 110 and 120, and/or OT proxy 130 to coordinate updates to web application object. Updates of the web application object may include commands for updating data included in the web application object, formatting the data included in the web application object, and/or other suitable commands for updating the web application object. In response to requesting access to the web application object, the user device 110 and/or 120 may receive the object model from the server 102 and store the object model as a local object model. The smart client 116 may store the object model and any subsequent updates of the object model in the form of mutations. The thin client 126 may store the object model as a subset of the web application object and may represent updates of the web application object in the form of high-level commands. Users interact with the server 102 such that the users 114 and 124, in conjunction with the server 102, compose a collaborative web application object. The users may update the web application object by modifying their respective local object model. Concepts described herein with respect to a collaborative electronic document may be adapted in a similar way for web application objects and/or other suitable electronic objects.

FIGS. 2-7 are example data structures for storing data related to a thin client session. These data structures may be stored in storage similar to the storage 134 of the OT proxy 130 of FIG. 1. A thin client session may be a semi-permanent information interchange between the thin client 126 and the OT proxy 130. The information interchange between the thin client 126 and the OT proxy 130 may include data transmitted from the thin client 126 to the OT proxy 130 via network 180 and/or data transmitted from the OT proxy 130 to the thin client 126 via network 180. The data structures 2-7 may support a protocol for ensuring sequential correctness of concurrent and/or collaborative changes made to the collaborative electronic document 104. Additionally, the data structures 2-7 may support synchronization of concurrent changes made to the collaborative electronic document 104.

Figure 2:
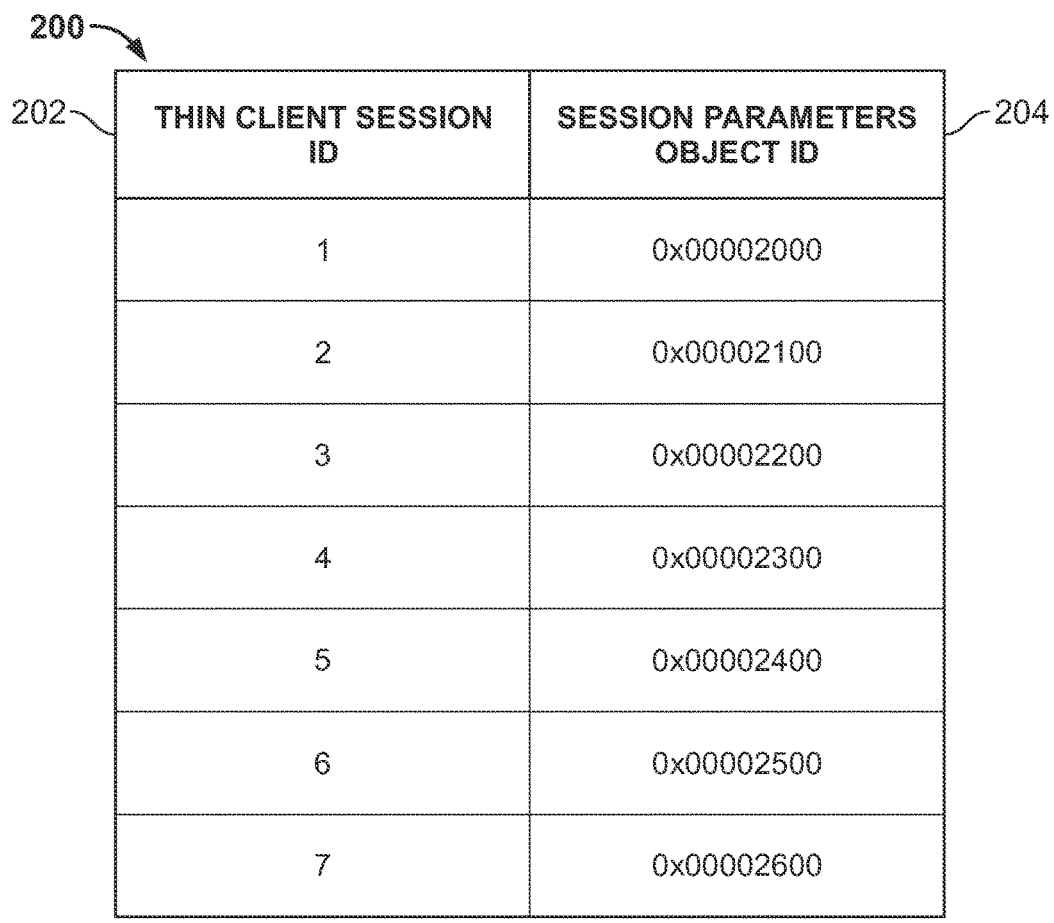

FIG. 2 is an example data structure 200 for storing a thin client session ID 202 and/or a corresponding session parameters data object ID 204 in storage similar to the storage 134 of FIG. 1. The thin client session ID 202 may be a unique identifier for identifying a thin client session with a thin client similar to the thin client 126 of FIG. 1. There may be a unique thin client session ID 202 per thin client 126 for each electronic document similar to the collaborative electronic document 104. The session parameters object ID 204 may be a memory location identifier for a session parameters object used for storing and organizing information related to the thin client session with the thin client 126. The description of FIGS. 3-7 below will further explain the data contained in the session parameters object. There may be a unique session parameters object for each thin client session.

Figure 3:
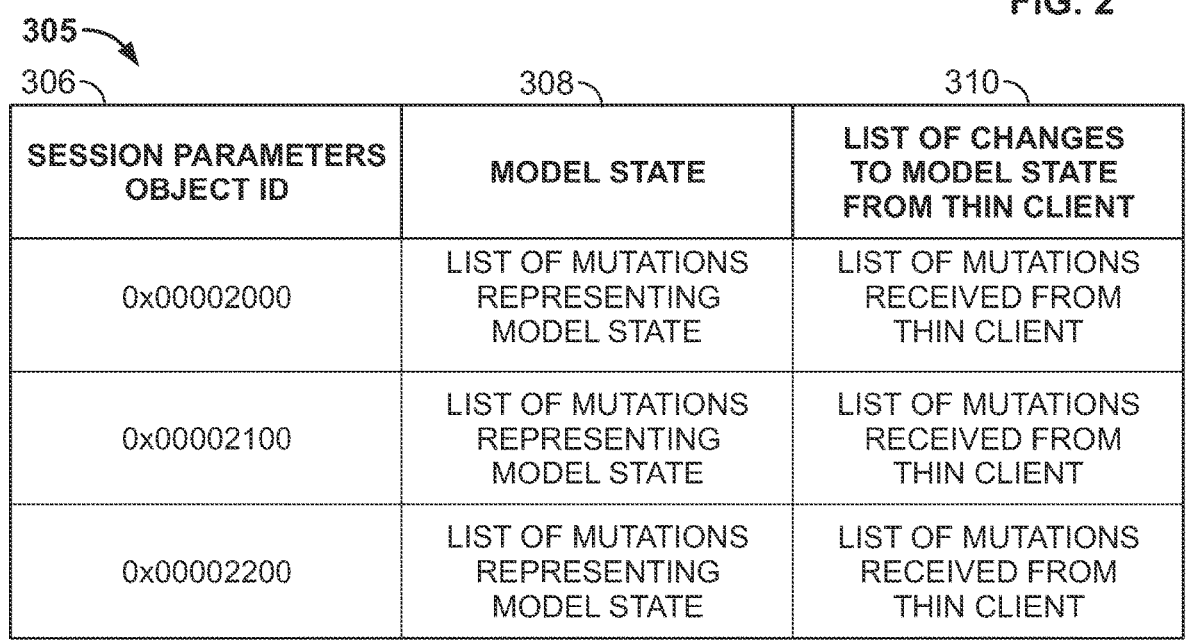

FIG. 3 is an example data structure 305 for storing a model state 308 of a collaborative electronic document similar to electronic document 104 of FIG. 1. For each collaborative session parameters object identified by a session parameters object ID 306, the model state 308 stores a latest document model of the collaborative electronic document 104 on the OT proxy 130. The model state 308 may include a list of mutations of the collaborative electronic document 104. In the exemplary case of a spreadsheet document, the list of mutations may address cells, ranges, and other suitable elements of a spreadsheet model. In addition to the latest model state 308 of the collaborative electronic document 104, the data structure 305 may be used for storing a list of mutations 310 of the model state that may have been received from the thin client 126.

FIG. 4 is an exemplary data structure 411 for storing pending requests from the thin client 126. For each collaborative session parameters object identified by a session parameters object ID 412, there may be a corresponding list of pending requests 414 received from the thin client 126. A pending request may include a request received at the OT proxy 130 from the thin client 126 to modify the collaborative electronic document 104, wherein the modifications contained in the request may not have been applied to the model state 308 of data structure 305. Each request is identified by a unique sequence number and a list of corresponding changes in the form of commands received from the thin client 126.

FIG. 5 is an exemplary data structure 515 for storing a list of mutations 518 for each thin client session parameters object ID 516 that may have been sent to the server 102, but may not have been acknowledged by the server 102.

FIG. 6 is an exemplary data structure 619 for storing a running copy of the model state 622 for each server revision number 624 sent to the thin client 126. For each session with the thin client 126, a corresponding session parameters object ID 620, a model state 622, and corresponding server revision number 624 may be stored. A model state 622 may be similar to the model state 308 of FIG. 3. A server revision number 624 may be a number, character, an alpha numeric string and/or any other suitable representation for the number of server revisions of the document model that may have been sent to the thin client 126. A server revision number 624 may identify a model state transmitted to the thin client 126, wherein the model state may include a transformed mutation. The transformed mutation herein may correspond to a mutation that may have been received from the server 102 at the OT proxy 130.

FIG. 7 is an exemplary data structure 725 for storing state data for supporting a protocol for coordinating the operational transformation of collaborative changes made to the collaborative electronic document 104. For every thin client session managed by the OT proxy 130, a corresponding session parameters object ID 726, a last processed thin client sequence number 728, a last known thin client sequence number 730, a last acknowledged thin client sequence number 732, and a last model state revision sent to the thin client 732 may be stored in data structure 725. The last processed thin client sequence number 728 may be an integer, one or more characters, an alphanumeric representation, and/or some other suitable representation of identifying the last successfully processed request for modifying a collaborative electronic document 104 that may have been received at the OT proxy 130 from the thin client 126. Successful processing of the thin client request may include conversion of a change to a mutation, wherein the change may be included in the request. In response to the conversion of the change to the mutation, the successful processing of the thin client request may include the transformation of subsequent mutations sequentially after the request to transformed subsequent mutations, transmission of the mutation to the server, and transmission of the transformed subsequent mutations to the thin client 126. The last known thin client sequence number 730 may be an integer, one or more characters, an alphanumeric representation, and/or some other suitable representation for identifying the last change request received at the OT proxy 130 from the thin client 126. The last acknowledged thin client sequence number 732 may be an integer, one or more characters, an alphanumeric representation, and/or some other suitable representation for identifying the last change request received at the OT proxy 130, for which, a response may have been transmitted by the OT proxy 130 to the thin client 126, and an acknowledgment confirming the receipt of the response may have been received at the OT proxy 130 from the thin client 126. The last model state revision sent to the thin client 734 may be an integer, one or more characters, an alphanumeric representation, and/or some other suitable representation for identifying the last revision number that may have been sent to the thin client 126 from the OT proxy 130.

Figure 8:
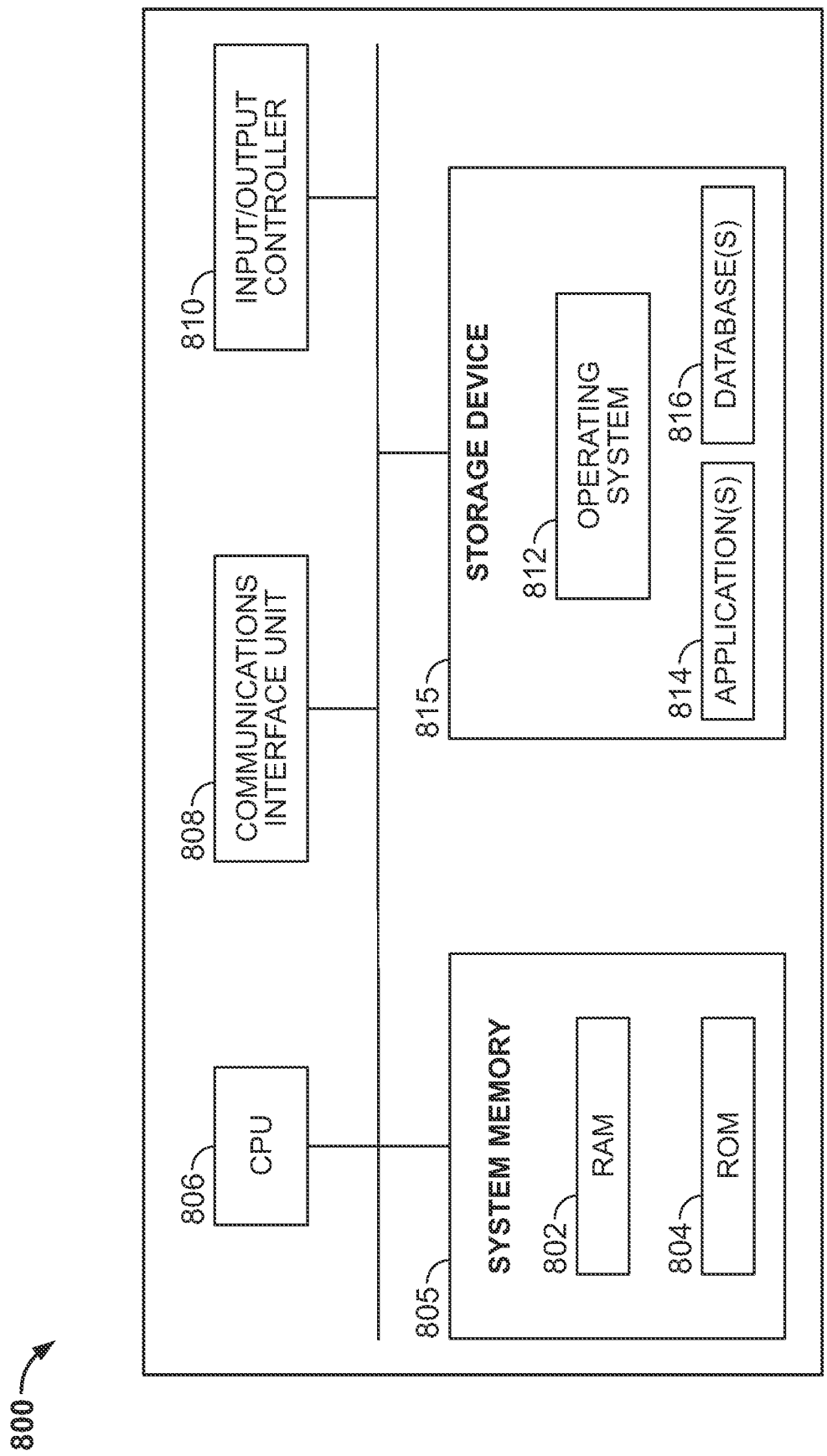
FIG. 8 is a block diagram of a computing device, such as any of the components of the system of FIG. 1, for performing any of the processes described herein, according to an illustrative embodiment.

FIG. 8 is a block diagram of a computing device 800, such as any of the components of the system of FIG. 1, for performing any of the processes described herein. Each of the components of these systems may be implemented on one or more computing devices 800. In some aspects, a plurality of the components of these systems may be included within one computing device 800. In some implementations, a component and a storage device may be implemented across several computing devices 800.

The computing device 800 comprises at least one communications interface unit 808, an input/output controller 810, system memory 805, and one or more data storage devices 815. The system memory includes at least one random access memory (RAM 802) and at least one read-only memory (ROM 804). All of these elements are in communication with a central processing unit (CPU 806) to facilitate the operation of the computing device 800. The computing device 800 may be configured in many different ways. For example, the computing device 800 may be a conventional standalone computer or alternatively, the functions of computing device 800 may be distributed across multiple computer systems and architectures. In FIG. 8, the computing device 800 can be linked, via network or local network, to other servers or systems.

The computing device 800 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 808 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 806 comprises a processor, such as one or more conventional microprocessors and one or more supplementary co-processors such as math co-processors for offloading workload from the CPU 806. The CPU 806 is in communication with the communications interface unit 808 and the input/output controller 810, through which the CPU 806 communicates with other devices such as other servers, user terminals, or devices. The communications interface unit 808 and the input/output controller 810 may include multiple communication channels for simultaneous communication with, for example, other processors, servers or client terminals.

The CPU 806 is also in communication with the data storage device. The data storage device may comprise an appropriate combination of magnetic, optical or semiconductor memory, and may include, for example, RAM 802, ROM 804, and flash drive, an optical disc such as a compact disc or a hard disk or drive. The CPU 806 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 806 may be connected to the data storage device via the communications interface unit 808. The CPU 806 may be configured to perform one or more particular processing functions.

The data storage device may store, for example, an operating system 812 for the computing device 800; (ii) one or more applications 814 (for example, computer program code or a computer program product) adapted to direct the CPU 806 in accordance with the systems and methods described here, and particularly in accordance with the processes described in detail with regard to the CPU 806; or (iii) database(s) 816 adapted to store information that may be utilized to store information required by the program.

The operating system 812 and applications 814 may be stored, for example, in a compressed, an un-compiled and an encrypted format, and may include computer program code.

The instructions of the program may be read into a main memory of the processor from a computer-readable medium other than the data storage device, such as from the ROM 804 or from the RAM 802. While execution of sequences of instructions in the program causes the CPU 806 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to editing a sub-section of a collaborative electronic document via a notification message as described herein. The program also may include program elements such as an operating system 812, a database management system and "device drivers" that allow the processor to interface with computer peripheral devices (for example, a video display, a keyboard, a computer mouse, etc.) via the input/output controller 810.

The term "computer-readable medium" as used herein refers to any non-transitory medium that provides or participates in providing instructions to the processor of the computing device 800 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying, one or more sequences of one or more instructions, to the CPU 806 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 800 (for example, a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 9:
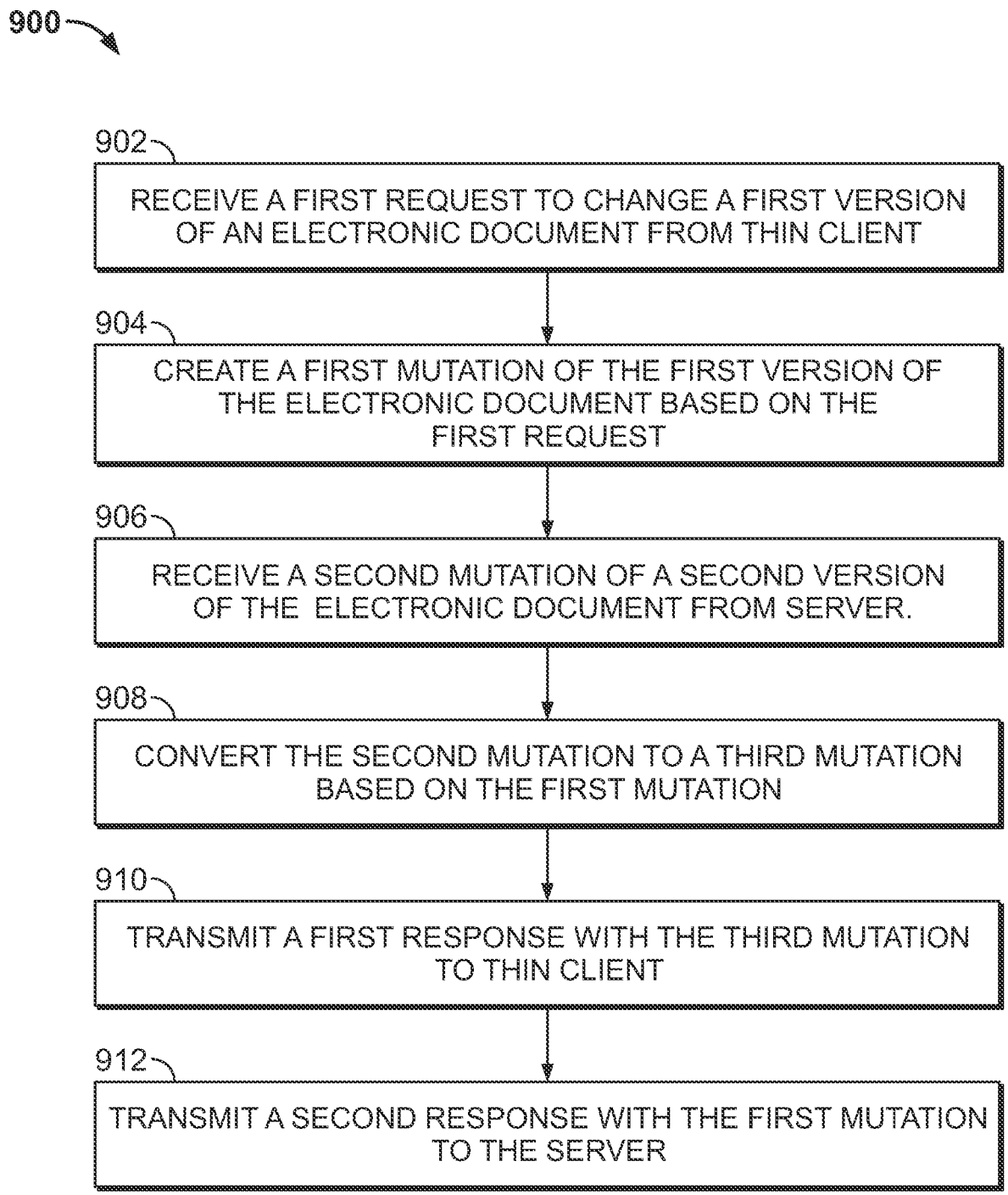
FIG. 9 is a flowchart of a method used to manage an operational transformation of a collaborative electronic document for a thin client, according to an illustrative embodiment.

FIG. 9 is a flowchart of a method 900 used to manage operational transformation of a collaborative electronic document for a thin client. The method 900 may be executed on, for example an OT proxy similar to the OT proxy 130 of FIG. 1, a server similar to server 102 of FIG. 1, and other suitable components as illustrated by the system 100 of FIG. 1.

At step 902, the OT proxy may receive a request from a thin client similar to the thin client 126 of FIG. 1. The request received at the OT proxy may include a sequence number for identifying the request. In addition to the sequence number, the request may contain a document model, a server revision number, high-level commands for making changes to the collaborative electronic document, and/or other suitable information for performing operational transformations for the thin client. The sequence number may be a unique identifier used by the thin client to identify and confer order on the change requests it may send to the OT proxy for modifying the collaborative electronic document. In some implementations this sequence number is initialized to −1 and the first request transmitted by a thin client 126 may have a sequence number of 1. In some implementations, subsequent requests, from the thin client 126, may have their sequence numbers incremented by a finite number, a pre-known pattern of numbers, a dynamically generated pattern of numbers, and/or other sequence number generation schemes for conferring an order on the requests. The document model included in the request may be similar to the document model 122 on the user device 120. The server revision number corresponds to a revision number similar to the revision number 624 of FIG. 6, of a most recently received server update of the document model 122 at the thin client 126.

At step 904, in response to receiving the change request from the thin client, the OT proxy, converts the high-level commands for making changes to the collaborative electronic document to a first mutation of the document model. In response to creating the first mutation, the OT proxy updates the state variables such as the last processed thin client sequence number 728 and the last known thin client sequence number 730 to the sequence number of the change request.

At step 906, the OT proxy may receive a second mutation of the collaborative electronic document from the server.

At step 908, in response to receiving the second mutation from the server, the OT proxy may transform the second mutation to a third mutation. The transformation may be based on the list of mutations 518 corresponding to the thin client session parameters object ID 516 contained in data structure 515 and/or the first mutation created in step 904. The OT proxy 130 may then store the third mutation in the model states 308 and 622 contained in data structures 305 and 619, respectively. The OT proxy may create a new entry with a newly generated server revision number 624 in the data structure 619. The OT proxy may store the third mutation in the model state 622 corresponding to the newly generated server revision number 624. In some implementations, the OT proxy may generate the new server revision number when it receives a mutation of the collaborative electronic document from the server. The server revision number 624 may be an integer, one or more characters, an alphanumeric representation, and/or another suitable representation for representing a sequence of mutations of the collaborative electronic document received from the server. In some implementations, the server revision number may be incremented by a finite number, a pre-known pattern of numbers, a dynamically generated pattern of numbers, and/or other sequence number generation schemes for storing the order in which the sequence of mutations may be received at the OT proxy from the server.

At step 910, the OT proxy transmits a first response to the thin client 126 from which the OT proxy received the first request at 902. The first response may include the sequence number corresponding to the last processed thin client sequence number 628, the third mutation, the newly generated server revision number 624, and/or the current document model 622.

At step 912, the OT proxy transmits a second response to the server. The second response may include the server revision number 624, the first mutation of the collaborative electronic document 104 as generated by the OT proxy, and other suitable information for coordinating the collaborative and/or collaborative editing of the collaborative electronic document.

Figure 10:
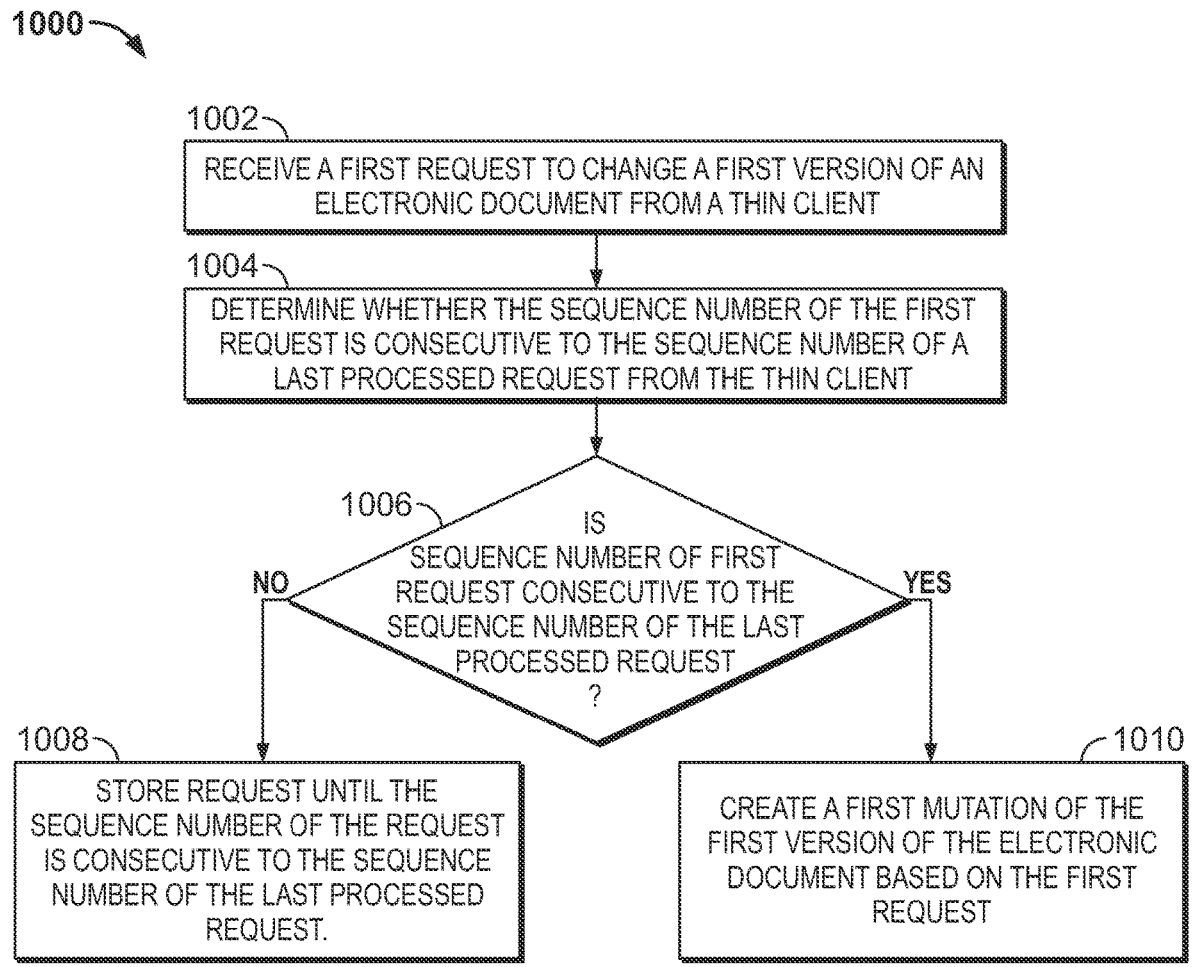
FIG. 10 is a flowchart of a method used for sequentially processing updates from a thin client of a collaborative electronic document, according to an illustrative embodiment.

FIG. 10 is a flowchart of a method 1000 for processing updates of a collaborative electronic document from a thin client such as the thin client 126 of FIG. 1. The method uses a sequence number associated with a request received from the thin client to confer an order on processing the requests. The method 1000 may be executed on, for example, an OT proxy similar to the OT proxy 130 of FIG. 1, a server similar to server 102 of FIG. 1, and/or other suitable components as illustrated by the system 100 of FIG. 1.

At step 1002, the OT proxy receives a first change request from the thin client. Step 1002 may be similar to step 902 of method 900.

At step 1004, in response to receiving the first request, the OT proxy determines whether the sequence number of the first request is consecutive to a sequence number of a last processed request received from the thin client. In this determination, the OT proxy may first look up data structure 200 to access the session parameters object ID 204 for a corresponding thin client session ID 202. In response to determining and accessing the session parameters object, the OT proxy may look up data structure 725 to access the corresponding last processed thin client sequence number field 728.

At step 1006, if the sequence number of the first request is consecutive to the last processed thin client sequence number field 728, then the OT proxy may process the request at step 1010. Alternatively, if the sequence number of the first request is not consecutive to the last processed thin client sequence number field 728 at step 1006, the OT proxy may store the request at step 1008 until requests with sequence numbers expected to be prior in order to the sequence number of the first request are processed by the OT proxy at 1002. In some implementations, a second sequence number may be considered consecutive to a first if it is a finite number greater than the first sequence number. In some implementations, the second sequence number may be considered to be consecutive to the first sequence number if the second sequence number is a next expected sequence number after the first sequence number in a pre-known pattern of numbers, a dynamically generated pattern of numbers, and/or other sequence number generation schemes.

At step 1010, the OT proxy may create a first mutation based on the first request received by the OT proxy. Step 1010 may be implemented similarly to step 904 of method 900.

At step 1008, the OT proxy may store the first request in a data structure similar to data structure 411 of FIG. 4. The OT proxy may store the first request in field 414 of data structure 411 for a session parameters object ID 412 corresponding to the thin client session for the collaborative electronic document.

Figure 11:
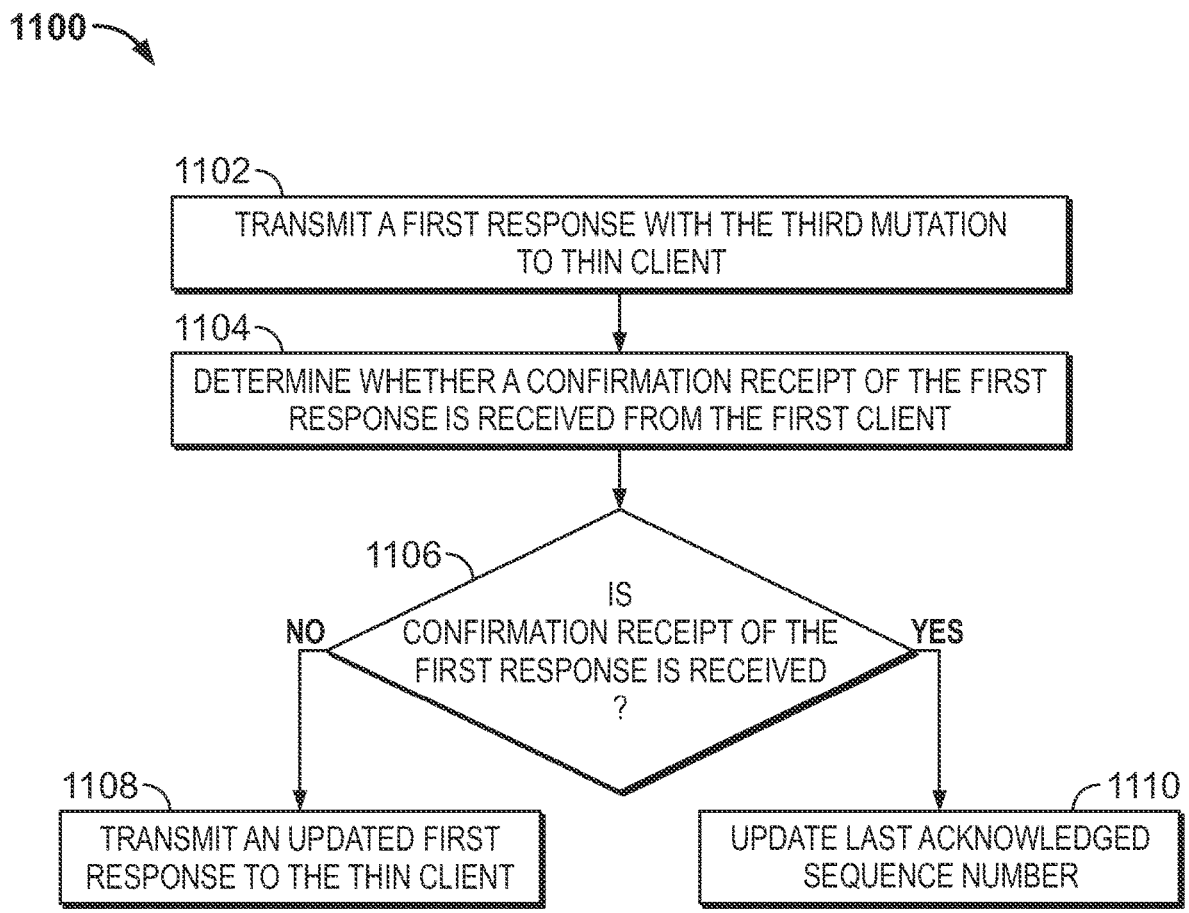
FIG. 11 is a flowchart of a method used for managing synchronization of updates from a thin client of a collaborative electronic document, according to an illustrative embodiment.

FIG. 11 is a flowchart of a method 1100 for managing synchronization of updates from a thin client of a collaborative electronic document. The thin client referred to herein may be similar to the thin client 126 of FIG. 1. The collaborative electronic document referred to herein may be similar to the collaborative electronic document 104 of FIG. 1. The method 1100 may be implemented on, for example, an OT proxy similar to the OT proxy 130 of FIG. 1, a server similar to server 102 of FIG. 1, and/or other suitable components as illustrated by the system 100 of FIG. 1.

At step 1102, the OT proxy transmits a first response similar to the first response sent at step 910 of method 900. In response to transmitting the response, the OT proxy may wait for a period of time to receive a confirmation receipt of the first response from the thin client.

At step 1104, the OT proxy determines whether the confirmation receipt of the first response is received. The OT proxy may wait after the period of time elapses to make this determination.

At step 1106, if the confirmation message is not received from the thin client and/or if a response rejection message is received from the thin client then the OT proxy may transmit a second response to the thin client at 1108. The second response may include a change to the document model 122 in the form of high-level commands, a latest server revision number 734 of data structure 725 of FIG. 7, and/or a last processed sequence number 728.

At step 1106, if a confirmation message confirming the receipt of the first response is received from the thin client by the OT proxy, then at 1110, the OT proxy updates a data structure similar to data structure 725 of FIG. 7. The updates of the data structure 725 may involve setting the last acknowledged thin client sequence number 732 to the sequence number included in the first response. The OT proxy may update the last model state revision sent to the thin client 734 of data structure 725 with the server revision number included in the first response.

FIGS. 12-15 are exemplary data flow diagrams for describing the exemplary sequences of events when an update to a collaborative electronic document is received at an OT proxy. The downward vertical direction in the diagrams represents the passage of time. The slanted arrowhead lines in the diagrams represent the direction of the flow of data between components of an illustrative collaborative electronic document editing system. To maintain simplicity, one thin client, one OT proxy, and one server component have been illustrated. The thin client, the OT proxy, and the server illustrated in FIGS. 7-10 may correspond to the thin client 126, the OT proxy 130, and the server 102 of FIG. 1, respectively. While FIGS. 12-15 illustrate one instance of the thin client, the OT proxy, and the server, there may be multiple instances of these components present in a collaborative electronic document editing system. The flow of data from the server to the OT proxy in FIGS. 12-15 also may be representative of the updates made by user devices with smart clients, where the updates may be communicated to the OT proxy via the server. In some implementations, the mutations may be directly sent to the OT proxy by the smart clients.

Figure 12:
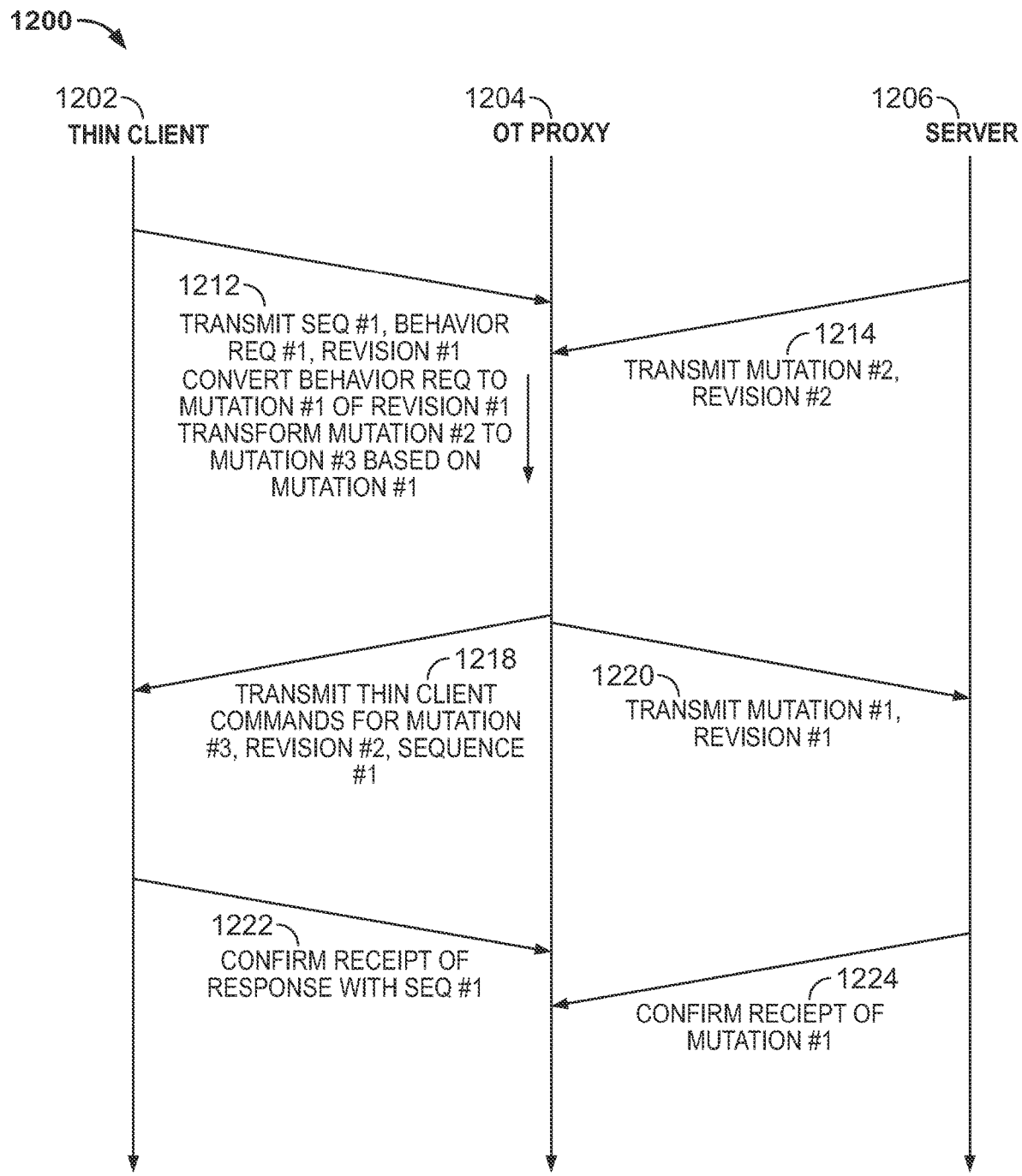
FIG. 12 is a diagram of a communication protocol used for synchronizing updates, from a thin client and/or a server, of a collaborative electronic document, according to an illustrative embodiment.

FIG. 12 is a diagram of an exemplary data flow 1200 for a communication protocol for synchronizing updates, of a collaborative electronic document.

A thin client 1202 transmits a change request 1212, in the exemplary data flow 1200, to an OT proxy 1204. The change request includes a sequence number #1, a high-level command for behavior request #1, a server revision number #1, and/or other suitable data related to the operational transformation of collaborative changes for the thin client 1202. In response to receiving the request 1212 at the OT proxy 1204, the OT proxy 1204 may determine whether to process the request 1212, using, for example, method 1000 of FIG. 10. While different OT proxy states may result in different method execution paths, for the purposes of simplicity, it is assumed that the request 1212 is the first request received from the thin client 1202. In response to receiving the request 1212, and determining that there are no previous pending requests from the thin client 1202, the high-level command for behavior request #1 may be converted to a corresponding first mutation #1 of the document. The conversion may be similar to step 904 of method 900 of FIG. 9.

In concurrence with the processing of the first request 1212 from the thin client 1202, a second change request 1214 may be received from the server 1206. The second change request 1214 may include a second mutation #2, a server version number #2, and/or other suitable data related to the operational transformation of collaborative changes for the thin client 1202.

In response to receiving the request from the server 1206, the OT proxy 1204 transforms the second mutation #2 to a third mutation #3 based on the first mutation and/or other pending mutations contained in a data structure similar to data structure 515 of FIG. 5. The transformation may be similar to step 908 of method 900 of FIG. 9. In response to transforming the second mutation #2 to the third mutation #3, the OT proxy 1204 may store the third mutation #3 in a model state, such as the model state 622 of FIG. 6. The OT proxy 1204 may store a corresponding incremented revision number in a data structure, such as the data structure 619 of FIG. 6. For example, if the data structure has a revision number #1 for a thin client session with the most recently updated model state, then the OT proxy 1204 may apply the third mutation to the most recently updated model state and store it under a revision number #2.

In response to generating the third mutation #3, the OT proxy 1204 transmits a first response 1218 to the thin client 1202. The first response 1218 includes high-level commands corresponding to the third mutation, a corresponding model state from a data structure similar to data structure 619 of FIG. 6, a sequence number #1, a server revision number #2, and/or other suitable data related to the operational transformation of collaborative changes for the thin client 1202.

In response to generating the third mutation #3, OT proxy 1204 transmits to the server 1206 a second response 1220. The second response 1220 includes the first mutation #1, the server revision number #1, and/or other suitable data related to the operational transformation of collaborative changes for the thin client 1202. Since in this exemplary case, the revision number #1 was received from the thin client 1202, the second response 1220 includes the revision number #1.

In response to receiving the first response, the thin client 1202 transmits a first message 1222 confirming the receipt of the first response 1218.

In response to receiving the second response, the server 1206 transmits a second message 1224 confirming the receipt of the second response 1220.

The first message 1222 and the second message 1224 are both received by the OT proxy 1204. In some implementations of the above described protocol, the OT proxy 1204 may not transmit any further responses to the thin client 1202 and/or the server 1206 until the OT proxy 1204 receives the first message 1222 from the thin client 1202 and/or the second message 1224 from the server 1206, respectively.

Figure 13:
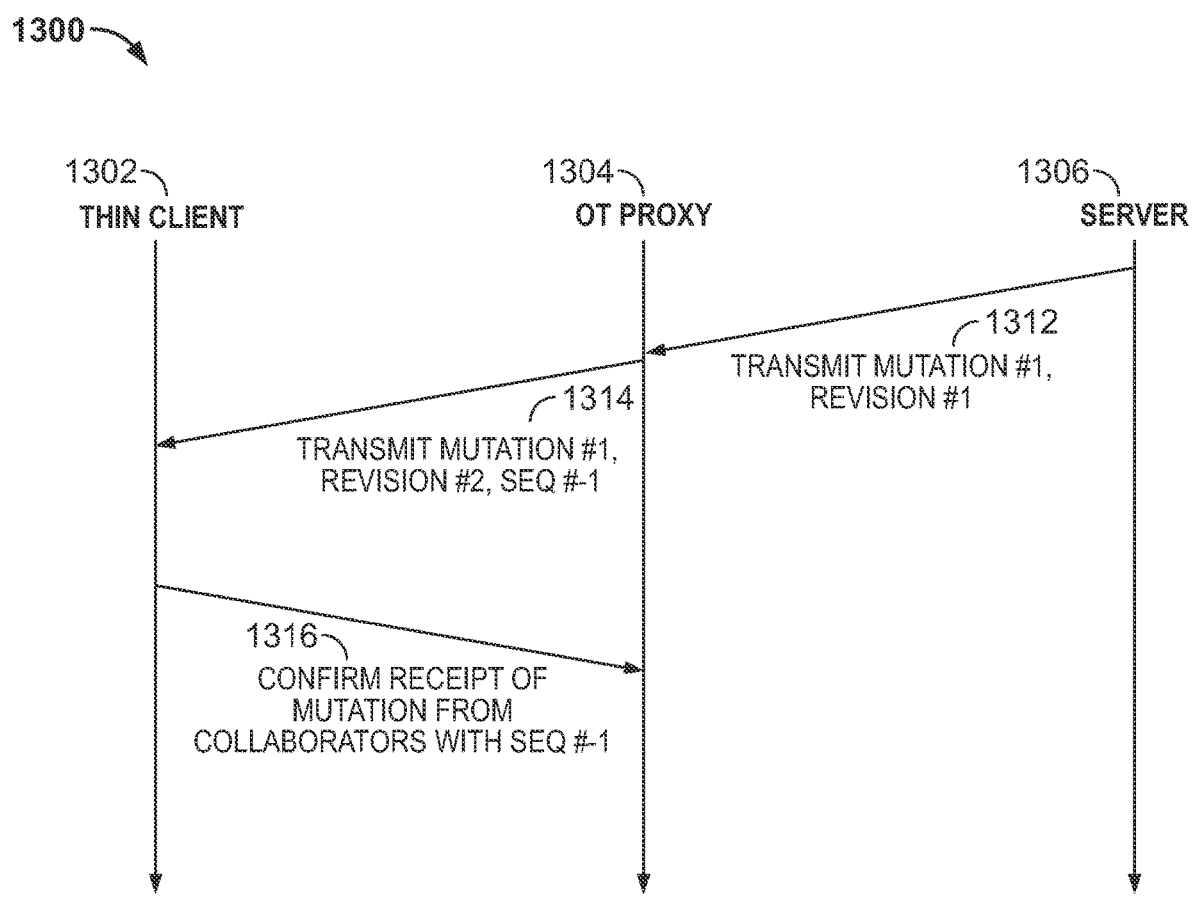
FIG. 13 is a diagram of a communication protocol used for processing updates from a server of a collaborative electronic document, according to an illustrative embodiment.

FIG. 13 is a diagram of an exemplary data flow 1300 for a communication protocol for processing updates from a server 1306 of a collaborative electronic document for a thin client 1304. For maintaining simplicity, this diagram assumes that there is one change request in flight from the server 1306. The data flow 1300 diagram assumes requests from the OT proxy 1304 to the server 1306 and to the thin client 1302, respectively, which may have been transmitted prior to the change request, have been acknowledged by the server 1306 and thin client 1302, respectively.

The server 1306 transmits a first request 1312 to the OT proxy 1304. The first request includes a first mutation #1, a server revision number #1, and/or other suitable data related to the operational transformation of collaborative changes for the thin client 1202.

The OT proxy 1304 receives the first request 1312. In response to finding no pending requests in a data structure similar to data structures 515 and/or 411, the OT proxy 1304 transmits to the thin client 1302 a first update 1314. The first update 1314 includes the first mutation #1, a revision number #2, and/or a sequence number #−1. In this exemplary data flow 1300, a sequence number of −1 indicates that the thin client 1302 did not send a change request to the OT proxy 1304 prior to the transmission of the first update 1314. While in this exemplary scheme, sequence number state variables similar to fields 728, 730, and 732 of data structure 725 of FIG. 7 are initialized to −1, other schemes may initialize the sequence number state variables. In the exemplary data flow 1300, the revision number for the first update is set to 2, and a revision number similar to revision number 624 FIG. 6 is updated when the first mutation is received from the server 1306.

In response to receiving the first update 1314, the thin client 1302 transmits a first message 1316 confirming the receipt of the first update with sequence number #−1. In response to receiving the first message, the OT proxy 1304 updates a last acknowledged thin client sequence number similar to the last acknowledged thin client sequence number 732 of FIG. 7 to −1.

Figure 14:
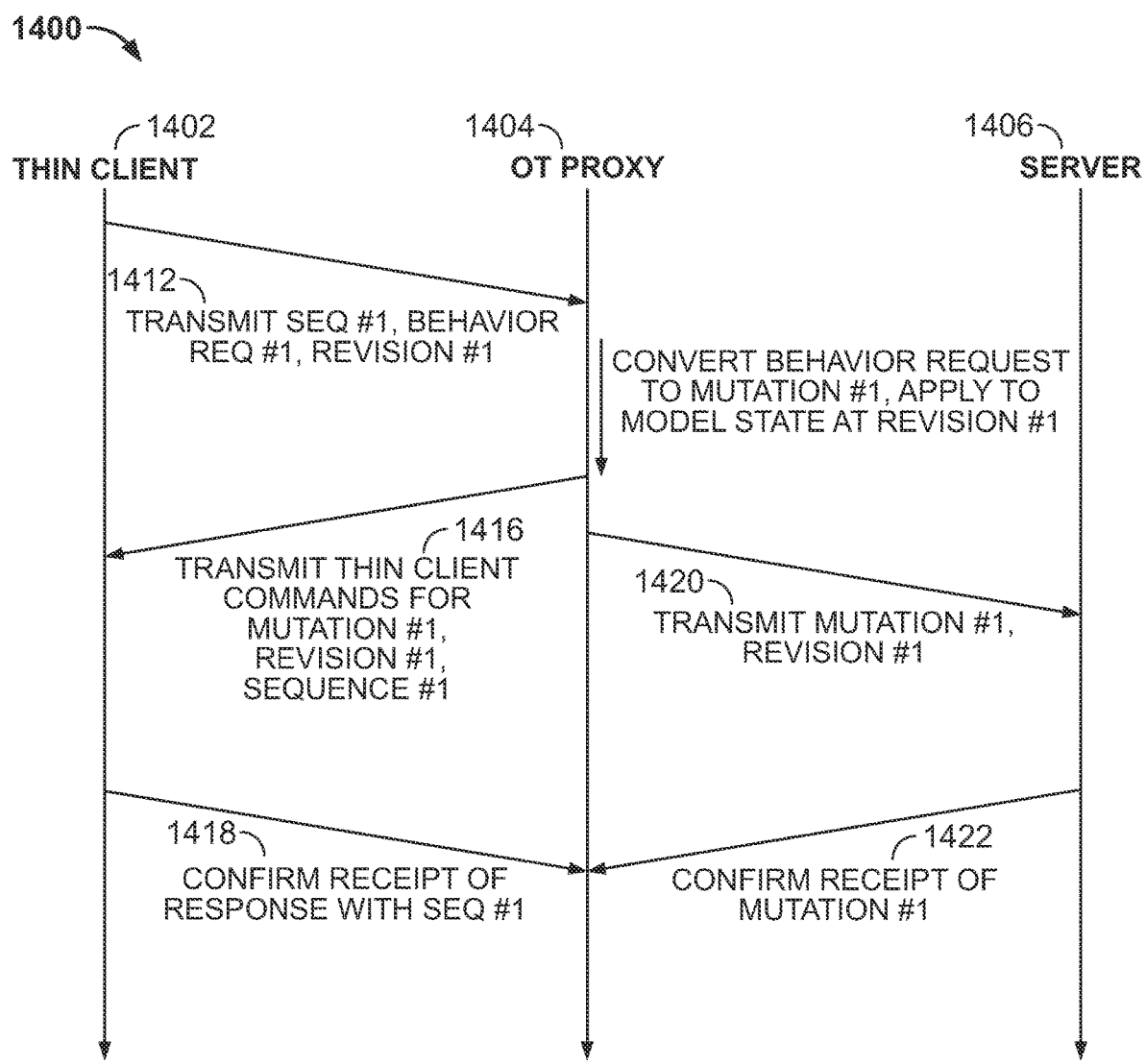
FIG. 14 is a diagram of a communication protocol used for processing updates from a thin client of a collaborative electronic document, according to an illustrative embodiment.

FIG. 14 is a diagram of an exemplary data flow 1400 for a communication protocol for processing updates from a thin client 1402 of an electronic document. The exemplary data flow 1400 illustrates a sequence of events when the only updates received at an OT proxy 1404 are from the thin client 1402.

The thin client 1402 transmits a first request 1412 to the OT proxy 1404. The first request includes a sequence number #1, a first high-level command for altering a collaborative electronic document, a server revision number #1, a first document model, and/or any other suitable data for performing operational transformation for the thin client 1402. The OT proxy 1404 receives the first request 1412 and converts the first high-level command to a first mutation #1. The OT proxy 1404 stores the first mutation #1 to a model state, similar to the model state 308 of FIG. 3. The model state may correspond to the first document model of the first request.

In response to updating the model state, the OT proxy 1404 transmits a first response 1416 to the thin client 1402. The first response 1416 includes the sequence number #1, high-level commands corresponding to the first mutation #1, a revision number #1, and/or other suitable data for performing operational transformation for the thin client 1402.

In response to updating the document, the OT proxy 1404 transmits a first update 1420 to the server 1406. The first update 1420 includes the first mutation #1, a revision number #1, and/or other data related to the operational transformation for a thin client 1402.

In response to the transmitting the first response 1416, the OT proxy 1404 receives a first message 1418 from the thin client 1402. The first message 1418 confirms the receipt of the first response 1416 at the thin client 1402.

In response to transmitting the first update 1420, the OT proxy 1404 receives a second message 1422 from the server 1406. In this scenario, the second message 1422 confirms the receipt of the first update 1420 by the server 1406.

Figure 15:
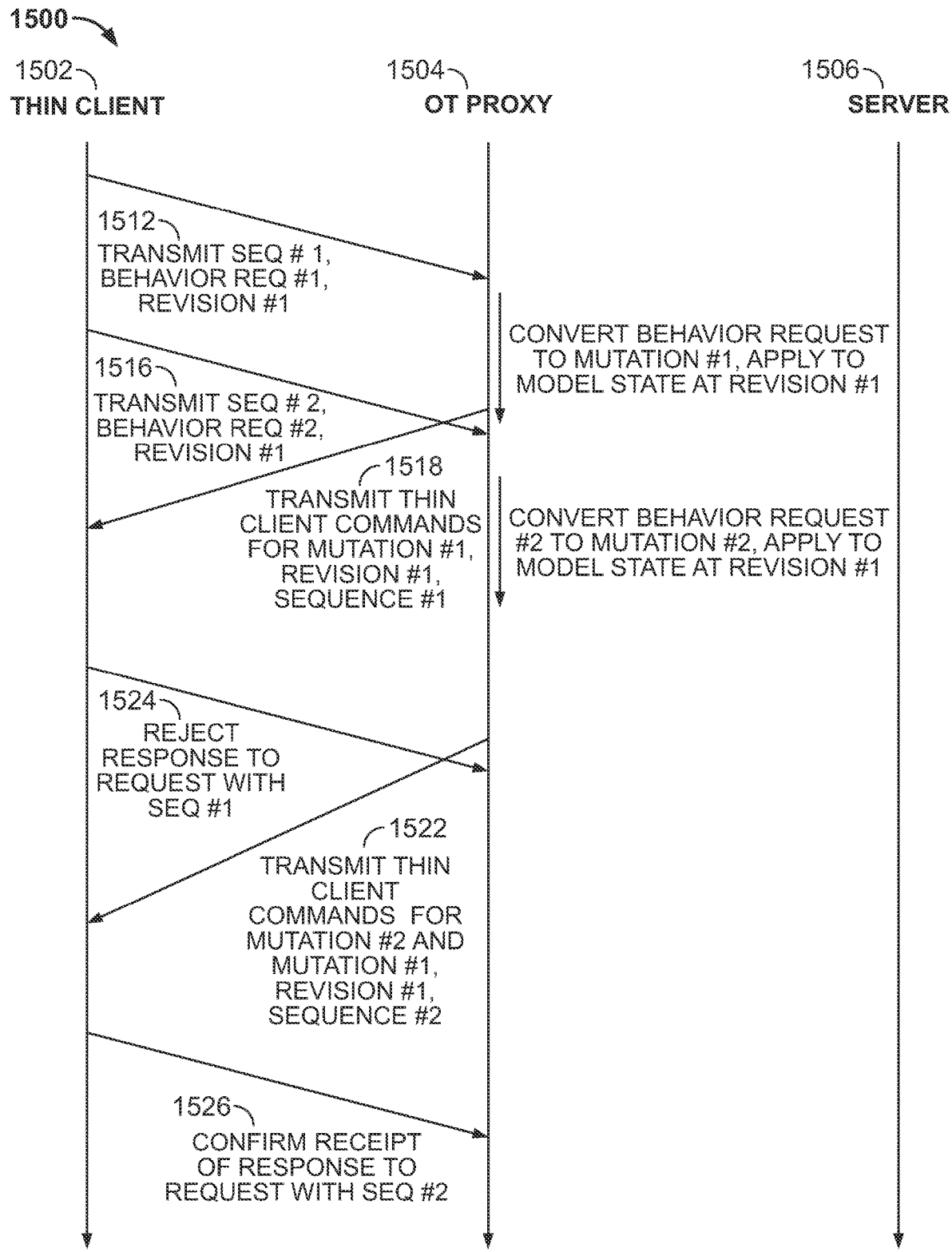
FIG. 15 is a diagram of a communication protocol used for synchronizing updates from a thin client of a collaborative electronic document, according to an illustrative embodiment.

FIG. 15 is a diagram of an exemplary data flow 1500 for a communication protocol for synchronizing updates from a thin client 1502 and a server 1506 of a collaborative electronic document.

In the exemplary scenario of data flow 1500, the thin client 1502 sends a first request 1512 with sequence number #1, a server revision number #1, a first document model, a first thin client command for modifying the first document model and/or other suitable data for performing operational transformation for the thin client 1502. The OT proxy 1504 receives the first request, converts the first thin client command to a first mutation #1, and stores it in a model state corresponding to the server revision number #1 similar to the model state 622 of FIG. 6.

The OT proxy 1504 transmits to the thin client 1502 a first response 1518 including a high-level commands corresponding to the first mutation #1, a sequence number #1, a server revision number #1, the model state, and/or other suitable data related to the operational transformation of collaborative changes for the thin client 1202.

The thin client 1502 transmits a second request 1516, prior to receiving the first response 1518. The second request 1516 includes a sequence number #2, a server revision number #1, a second document model, a second high-level command for modifying the document model, and/or other data related to changes made by a user to a collaborative electronic document at the thin client 1502. The OT proxy 1504 receives the second request 1516, converts the second high-level command to a second mutation #2, and stores the second mutation #2 in the model state.

The OT proxy 1504 transmits to the thin client 1502 a second response 1522 including a high-level command corresponding to the first and second mutation, a sequence number #2, the server revision number #1, and the model state. Since the OT proxy 1504 does not receive a message confirming the receipt of the first response 1518 from the thin client 1502, the second response 1522 includes high-level commands corresponding to the first and second mutation.

On the thin client side of the protocol, once the thin client 1502 receives the first response 1518, it compares the sequence number #1 included in the first response 1518 to a sequence number of a most recent request sent from the thin client 1502 to the OT proxy 1504. In the data flow 1500 diagram, the most recent request sent from the thin client 1502 to the OT proxy 1504 is the second request 1516. The sequence number #1 of the first response 1518 does not match the sequence number #2 of the most recent request sent from the thin client 1502.

In response to determining the sequence number mismatch, the thin client 1502 sends a first message 1524 rejecting the first response 1518. Shortly after rejecting the first response 1518, the thin client 1502 receives the second response 1522 with the sequence number #2.

In response to matching the sequence number of the second response 1522 with the sequence number of the last request sent to the OT proxy 1504, the thin client 1502 sends a second message 1526 confirming the successful receipt of the second response.

While various embodiments of the present disclosure have been shown and described herein, it will be understood that such embodiments are provided by way of example only. Numerous variations, changes, and substitutions will now be understood without departing from the disclosure. For example, while FIGS. 1-15 describe systems and methods for collaboratively editing an electronic document, the described systems and methods may be applied to electronic objects of any type, including, for example data structures, web application objects and/or other similar electronic objects. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A method comprising:
receiving, at an operational transformations (OT) proxy executed by a processor and from a thin client, a first request to make a first change to a first version of an electronic document, wherein the first version comprises a copy of the electronic document on the thin client, wherein the thin client is unable to support transformation of low-level commands comprising mutations of the electronic document, wherein the first request is a first high-level command that represents the first change to the electronic document and that operates at a higher level of abstraction than the low-level commands, and wherein the thin client is able to support the first change;
converting, at the OT proxy, the first high-level command of the first request into a first one of the low-level commands for making the first change to the first version of the electronic document;
receiving, at the OT proxy and from a server that coordinates mutations to the electronic document from one or more smart clients that are able to support the low-level commands, a second one of the low-level commands for making a second change to a second version of the electronic document, wherein the second version comprises another copy of the electronic document on the server, wherein a copy of the first version of the electronic document and a copy of the second version of the electronic document are stored on the OT proxy, and wherein the smart clients do not send the low-level commands directly to the OT proxy;
transforming, at the OT proxy, the second one of the low-level commands into a third one of the low-level commands based on the pending first one of the low-level commands that has not yet been applied to the electronic document by the server;
transmitting, from the OT proxy to the thin client, a first response corresponding to the third one of the low-level commands, wherein the first response is a second high-level command that represents the second change, and wherein the thin client is able to support the second change; and
transmitting, from the OT proxy to the server, a second response comprising the first one of the low-level commands.

2. The method of claim 1, wherein the first request comprises:

a first sequence number corresponding to a unique number for identifying the first request received from the thin client; and
a first revision number corresponding to the first version of the electronic document on the thin client, wherein the first version of the electronic document on the thin client is a subset of the electronic document.

3. The method of claim 2, further comprising:
determining, at the OT proxy, whether the first sequence number of the first request received from the thin client is consecutive to a third sequence number of a last processed request received from the thin client based on a thin client session identification number;
in response to determining that the first sequence number of the first request received from the thin client is consecutive to the third sequence number of the last processed request received from the thin client, processing, at the OT proxy, the first request; and
in response to determining that the first sequence number of the first request received from the thin client is not consecutive to the third sequence number of the last processed request, storing, at the OT proxy, the first request until the first sequence number of the first request received from the thin client is consecutive to the third sequence number of the last processed request.

4. The method of claim 1, wherein the first response further comprises:
a second revision number corresponding to the second version of the electronic document on the server, wherein the second version of the electronic document is a subset of the electronic document and is stored as a sequence of mutations; and
a second sequence number corresponding to a last acknowledged sequence number for the thin client.

5. The method of claim 4, further comprising:
in response to transmitting the first response to the thin client, determining, at the OT proxy, whether a message confirming receipt of the transmitted first response is received from the thin client based on a thin client session identification number;
in response to determining that the message confirming receipt of the transmitted first response is received from the thin client, updating, at the OT proxy, the last acknowledged sequence number for the thin client; and
in response to determining that the message confirming receipt of the transmitted first response is not received from the thin client, transmitting, from the OT proxy, an updated first response to the thin client.

6. The method of claim 5, wherein the first response transmitted to the thin client comprises only one sequence number pending receipt at the OT proxy of the message confirming receipt of the first response from the thin client.

7. The method of claim 1, wherein the thin client comprises at least one of a mobile web browser, a single threaded browser application, or a limited functionality web browser application, and wherein the thin client has an associated session identification number for each electronic document to which the thin client makes the first change.

8. The method of claim 1, wherein the OT proxy comprises at least one of a thread of a multi-threaded server application, a server application, or a distributed application.

9. The method of claim 1, further comprising:
updating, at the thin client, the first version of the electronic document with the first change;
storing the updated first version of the electronic document in a storage local to the thin client; and updating, at the thin client, a local view of the electronic document with the updated first version of the electronic document.

10. The method of claim 1, wherein the second version of the electronic document comprises a copy of the electronic document on a smart client among the smart clients and the second mutation comprises a second change to the second version of the electronic document made by the smart client.

11. A system comprising:
a memory that stores instructions for an operational transformations (OT) proxy; and
a processor configured to execute the instructions for the OT proxy to:
receive, from a thin client, a first request to make a first change to a first version of an electronic document, wherein the first version comprises a copy of the electronic document on the thin client, wherein the thin client is unable to support transformation of low-level commands comprising mutations of the electronic document, wherein the first request is a first high-level command that represents the first change to the electronic document and that operates at a higher level of abstraction than the low-level commands, and wherein the thin client is able to support the first change;
convert the first high-level command of the first request into a first one of the low-level commands for making the first change to the first version of the electronic document;
receive, from a server that coordinates mutations to the electronic document from one or more smart clients that are able to support the low-level commands, a second one of the low-level commands for making a second change to a second version of the electronic document, wherein the second version comprises another copy of the electronic document on the server, wherein a copy of the first version of the electronic document and a copy of the second version of the electronic document are stored on the OT proxy, and wherein the smart clients do not send the low-level commands directly to the OT proxy;
transform the second one of the low-level commands into a third one of the low-level commands based on the pending first one of the low-level commands that has not yet been applied to the electronic document by the server;
transmit, to the thin client, a first response corresponding to the third one of the low-level commands, wherein the first response is a second high-level command that represents the second change, and wherein the thin client is able to support the second change; and
transmit, to the server, a second response comprising the first one of the low-level commands.

12. The system of claim 11, wherein the first request comprises:
a first sequence number corresponding to a unique number for identifying the first request received from the thin client; and
a first revision number corresponding to the first version of the electronic document on the thin client, wherein the first version of the electronic document on the thin client is a subset of the electronic document.

13. The system of claim 12, wherein the processor is further configured to execute the instructions of the OT proxy to:
determine whether the first sequence number of the first request received from the thin client is consecutive to a third sequence number of a last processed request received from the thin client based on a thin client session identification number;
in response to a determination that the first sequence number of the first request received from the thin client is consecutive to the third sequence number of the last processed request received from the thin client, process the first request; and
in response to a determination that the first sequence number of the first request received from the thin client is not consecutive to the third sequence number of the last processed request, store the first request until the first sequence number of the first request received from the thin client is consecutive to the third sequence number of the last processed request.

14. The system of claim 11, wherein the first response further comprises:
a second revision number corresponding to the second version of the electronic document on the server, wherein the second version of the electronic document is a subset of the electronic document and is stored as a sequence of mutations; and
a second sequence number corresponding to a last acknowledged sequence number for the thin client.

15. The system of claim 14, wherein the processor is further configured to execute the instructions of the OT proxy to:
in response to the transmission of the first response to the thin client, determine whether a message confirming receipt of the transmitted first response is received from the thin client based on a thin client session identification number;
in response to a determination that the message confirming receipt of the transmitted first response is received from the thin client, update the last acknowledged sequence number for the thin client; and
in response to a determination that the message confirming receipt of the transmitted first response is not received from the thin client, transmit an updated first response to the thin client.

16. The system of claim 15, wherein the first response transmitted to the thin client comprises only one sequence number pending receipt at the OT proxy of the message confirming receipt of the first response from the thin client.

17. The system of claim 11, wherein the thin client comprises at least one of a mobile web browser, a single threaded browser application, or a limited functionality web browser application.

18. The system of claim 11, wherein the OT proxy comprises at least one of a thread of a multi-threaded server application, a server application, or a distributed application, and wherein the thin client has an associated session identification number for each electronic document to which the thin client makes the first change.

19. The system of claim 11, wherein the thin client is configured to:
update the first version of the electronic document with the first change;
store the updated first version of the electronic document in a storage local to the thin client; and
update a local view of the electronic document with the updated first version of the electronic document.

20. A non-transitory computer readable medium having stored therein instructions that, when executed by a processor, causes the processor to:

receive, at an operational transformations (OT) proxy executed by the processor and from a thin client, a first request to make a first change to a first version of an electronic document, wherein the first version comprises a copy of the electronic document on the thin client, wherein the thin client is unable to support transformation of low-level commands comprising mutations of the electronic document, wherein the first request is a first high-level command that represents the first change to the electronic document and that operates at a higher level of abstraction than the low-level commands, and wherein the thin client is able to support the first change;

convert the first high-level command of the first request into a first one of the low-level commands for making the first change to the first version of the electronic document;

receive, from a server that coordinates mutations to the electronic document from one or more smart clients that are able to support the low-level commands, a second one of the low-level commands for making a second change to a second version of the electronic document, wherein the second version comprises another copy of the electronic document on the server, wherein a copy of the first version of the electronic document and a copy of the second version of the electronic document are stored on the OT proxy, and wherein the smart clients do not send the low-level commands directly to the OT proxy;

transform the second one of the low-level commands into a third one of the low-level commands based on the pending first one of the low-level commands that has not yet been applied to the electronic document by the server;

transmit, to the thin client, a first response corresponding to the third one of the low-level commands, wherein the first response is a second high-level command that represents the second change, and wherein the thin client is able to support the second change; and transmit, to the server, a second response comprising the first one of the low-level commands.

21. The non-transitory computer readable medium of claim 20, wherein the first request comprises:
a first sequence number corresponding to a unique number for identifying the first request received from the thin client; and
a first revision number corresponding to the first version of the electronic document on the thin client, wherein the first version of the electronic document on the thin client is a subset of the electronic document.

22. The non-transitory computer readable medium of claim 21, wherein the instructions are further to cause the processor to:
determine whether the first sequence number of the first request received from the thin client is consecutive to a third sequence number of a last processed request received from the thin client based on a thin client session identification number;
in response to a determination that the first sequence number of the first request received from the thin client is consecutive to the third sequence number of the last processed request received from the thin client, process the first request; and
in response to a determination that the first sequence number of the first request received from the thin client is not consecutive to the third sequence number of the last processed request, store the first request until the first sequence number of the first request received from the thin client is consecutive to the third sequence number of the last processed request.

23. The non-transitory computer readable medium of claim 20, wherein the first response further comprises:
a second revision number corresponding to the second version of the electronic document on the server, wherein the second version of the electronic document is a subset of the electronic document and is stored as a sequence of mutations; and
a second sequence number corresponding to a last acknowledged sequence number for the thin client.

24. The non-transitory computer readable medium of claim 23, wherein the instructions are further to cause the processor to:
in response to the transmission of the first response to the thin client, determine whether a message confirming receipt of the transmitted first response is received from the thin client based on a thin client session identification number;
in response to a determination that the message confirming receipt of the transmitted first response is received from the thin client, update the last acknowledged sequence number for the thin client; and
in response to a determination that the message confirming receipt of the transmitted first response is not received from the thin client, transmit an updated first response to the thin client.

25. The non-transitory computer readable medium of claim 24, wherein the first response transmitted to the thin client comprises only one sequence number pending receipt at the OT proxy of the message confirming receipt of the first response from the thin client.

26. The non-transitory computer readable medium of claim 20, wherein the thin client comprises at least one of a mobile web browser, a single threaded browser application, or a limited functionality web browser application, and wherein the thin client has an associated session identification number for each electronic document to which it makes the first change.

27. The non-transitory computer readable medium of claim 20, wherein the OT proxy comprises at least one of a thread of a multi-threaded server application, a server application, or a distributed application.

28. The non-transitory computer readable medium of claim 20, wherein the thin client is configured to:
update the first version of the electronic document with the first change;
store the updated first version of the electronic document in a storage local to the thin client; and
update a local view of the electronic document with the updated first version of the electronic document.

* * * * *